(12) United States Patent
Grosz et al.

(10) Patent No.: US 8,923,551 B1
(45) Date of Patent: *Dec. 30, 2014

(54) SYSTEMS AND METHODS FOR AUTOMATICALLY CREATING A PHOTO-BASED PROJECT BASED ON PHOTO ANALYSIS AND IMAGE METADATA

(71) Applicant: Interactive Memories Inc., Palo Alto, CA (US)

(72) Inventors: Aryk Erwin Grosz, Palo Alto, CA (US); Anthony Jan Fung Lai, Mountain View, CA (US); Dan Schultz, Sunnyvale, CA (US); Denys Barushev, Mountain View, CA (US); Anton Vladimirovich Astashov, Palo Alto, CA (US)

(73) Assignee: Interactive Memories, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,507

(22) Filed: Jul. 16, 2014

(51) Int. Cl.
| | |
|---|---|
| G06K 9/00 | (2006.01) |
| G06K 9/62 | (2006.01) |
| G06K 9/60 | (2006.01) |
| G06F 17/00 | (2006.01) |
| G06F 17/21 | (2006.01) |
| G06T 11/60 | (2006.01) |
| G06T 11/00 | (2006.01) |
| H04L 29/06 | (2006.01) |
| G06F 17/30 | (2006.01) |

(52) U.S. Cl.
CPC .......... *G06F 17/212* (2013.01); *G06K 9/00288* (2013.01); *G06K 9/6267* (2013.01); *G06T 11/60* (2013.01); *G06T 11/001* (2013.01); *H04L 67/42* (2013.01); *G06F 17/30247* (2013.01); *G06T 2200/21* (2013.01)

USPC .......... 382/100; 382/118; 382/224; 382/305; 715/202

(58) Field of Classification Search
USPC .................. 382/100, 118, 224, 305
See application file for complete search history.

(56) References Cited

U.S. PATENT DOCUMENTS

| 4,888,648 A | 12/1989 | Hirose et al. |
| 6,147,768 A | 11/2000 | Norris |

(Continued)

OTHER PUBLICATIONS

Susanne Boll, Philipp Sandhaus, Ansgar Scherp, and Utz Westermann. 2007. Semantics, content, and structure of many for the creation of personal photo albums. In Proceedings of the 15th international conference on Multimedia (MULTIMEDIA '07). ACM, New York, NY, USA, 641-650.*

(Continued)

*Primary Examiner* — Utpal Shah
(74) *Attorney, Agent, or Firm* — American Patent Agency PC; Daniar Hussain; Mark P. Terry

(57) ABSTRACT

In some embodiments, a server, system, and method for automatically creating a photo-based project based on photo analysis and image metadata is disclosed. The method includes the steps of: receiving a plurality of images from a user-device, reading embedded metadata from the plurality of images, and storing said plurality of images in a data repository; performing photo analysis on the plurality of images in the data repository to determine a visual content and relevant metadata in the images; customizing the photo-based project automatically by performing one or more automatic customization actions based on the visual content in and the relevant metadata in the plurality of images; placing the plurality of images automatically in one or more particular page layouts of the photo-based project based on the customization performed; and generating a printed product comprising the plurality of images based on the customization performed.

30 Claims, 29 Drawing Sheets

(56) References Cited

U.S. PATENT DOCUMENTS

| | | | | |
|---|---|---|---|---|
| 6,362,900 | B1* | 3/2002 | Squilla et al. | 358/442 |
| 6,389,181 | B2* | 5/2002 | Shaffer et al. | 382/305 |
| 6,583,799 | B1 | 6/2003 | Manolis et al. | |
| 6,931,147 | B2 | 8/2005 | Colmenarez et al. | |
| 7,117,519 | B1 | 10/2006 | Anderson et al. | |
| 7,146,575 | B2 | 12/2006 | Manolis et al. | |
| 7,362,919 | B2* | 4/2008 | Das et al. | 382/284 |
| 7,383,282 | B2 | 6/2008 | Whitehead et al. | |
| 7,474,801 | B2 | 1/2009 | Teo et al. | |
| 7,479,949 | B2 | 1/2009 | Jobs et al. | |
| 7,970,240 | B1* | 6/2011 | Chao et al. | 382/305 |
| 8,326,945 | B2* | 12/2012 | Grosz et al. | 709/218 |
| 8,345,934 | B2 | 1/2013 | Obrador et al. | |
| 8,358,846 | B2 | 1/2013 | Gibbs | |
| 8,363,888 | B2 | 1/2013 | Chen et al. | |
| 8,396,326 | B2 | 3/2013 | Chen et al. | |
| 8,503,857 | B2 | 8/2013 | Sikorski | |
| 8,554,020 | B2* | 10/2013 | Berger et al. | 382/305 |
| 8,555,154 | B2 | 10/2013 | Chen et al. | |
| 8,571,331 | B2 | 10/2013 | Cifarelli | |
| 8,611,677 | B2 | 12/2013 | Das et al. | |
| 8,660,366 | B2* | 2/2014 | Chen et al. | 382/209 |
| 2004/0032599 | A1* | 2/2004 | Atkins et al. | 358/1.9 |
| 2005/0129334 | A1 | 6/2005 | Wilder et al. | |
| 2008/0155422 | A1* | 6/2008 | Manico et al. | 715/731 |
| 2009/0235563 | A1 | 9/2009 | Lehrman | |
| 2010/0241939 | A1 | 9/2010 | Rozen-Atzmon | |
| 2010/0241945 | A1 | 9/2010 | Chen et al. | |
| 2011/0211736 | A1* | 9/2011 | Krupka et al. | 382/118 |
| 2012/0066573 | A1* | 3/2012 | Berger et al. | 715/202 |
| 2012/0141023 | A1* | 6/2012 | Wang et al. | 382/162 |
| 2013/0301934 | A1 | 11/2013 | Cok | |
| 2013/0322707 | A1 | 12/2013 | Phillips et al. | |

OTHER PUBLICATIONS

Jun Xiao, Xuemei Zhang, Phil Cheatle, Yuli Gao, and C. Brian Atkins. 2008. Mixed-initiative photo collage authoring. In Proceedings of the 16th ACM international conference on Multimedia (MM '08). ACM, New York, NY, USA, 509-518.*

Picaboo, "Picaboo photo uploading," Picaboo website, available at http://picaboo.com/ Accessed on Mar. 4, 2014.
Shutterfly, "Shuttertly photo uploading," Shutterfly website, available at http://www.shutterfly.com/ Accessed on Mar. 4, 2014.
Snapfish, "Snapfish photo uploading," Snapfish website, available at http://www.snapfish.com/ Accessed on Mar. 4, 2014.
Cluster, "Cluster photo album," Cluster website, available at https://cluster.co/ Accessed on Feb. 3, 2014.
Lulu, "Lulu photo books," Lulu website, available at http://www.lulu.com/ Accessed on Feb. 3, 2014.
Artscow, "Artscow photo album," Artscow website, available at http://www.artscow.com/ Accessed on Feb. 3, 2014.
CVS Photocenter, "CVS Photocenter photobook," CVS Photocenter website, available at http://www.cvsphoto.com/ Accessed on Feb. 3, 2014.
Digilabs, "Digilabs photo album," Digilabs website, available at http://www.digilabspro.com/ Accessed on Feb. 3, 2014.
Blurb, "Blurb photo album," Blurb website, available at http://www.blurb.com/ Accessed on Feb. 3, 2014.
MyCanvas, "MyCanvas photo album," MyCanvas website, available at http://www.mycanvas.com/ Accessed on Feb. 3, 2014.
MyPublisher, "MyPublisher photo album," MyPublisher website, available at http://www.mypublisher.com/ Accessed on Feb. 3, 2014.
Keepsy, "Keepsy photo album," Keepsy website, available at http://www.keepsy.com/ Accessed on Feb. 3, 2014.
Winkflash, "Winkflash photo album," Winkflash website, available at http://www.winkflash.com/ Accessed on Feb. 3, 2014.
Yogile, "Yogile photo album," Yogile website, available at http://www.yogile.com/ Accessed on Feb. 3, 2014.
Facebook'S Shared Photo Album, "Facebook's shared photo album," Facebook's shared photo album website, available at https://www.facebook.com/help/151724461692727 Accessed on Feb. 3, 2014.
Jacobs, et al., "Multiresolution Image Querying," Proceedings of the 22nd Annual Conference on Computer Graphics and Interactive Techniques, SIGGRAPH 1995, pp. 277-286, U.S.
Athentec Imaging Inc., "Perfectly Clear by Athentech Imaging," available at http://www.athentech.com/ Accessed on Mar. 10, 2014.
Cheng, et al. "Salient Object Detection and Segmentation," IEEE Transactions on Pattern, 2011, U.S.

* cited by examiner

SYSTEMS AND METHODS FOR AUTOMATICALLY CREATING A PHOTO-BASED PROJECT BASED ON PHOTO ANALYSIS AND IMAGE METADATA

NOTICE OF COPYRIGHTS AND TRADEDRESS

A portion of the disclosure of this patent related document contains material which is subject to copyright protection. This patent related document may show and/or describe matter which is or may become tradedress of the owner. The copyright and tradedress owner has no objection to the facsimile reproduction by anyone of the patent disclosure as it appears in the Patent and Trademark Office patent files or records, but otherwise reserves all copyright and tradedress rights whatsoever.

FIELD OF THE INVENTION

The present invention is in the field of electronic commerce and pertains particularly to a method and apparatus for the automated creation and editing of media-based projects using a graphical user interface over a communications network.

BACKGROUND OF THE INVENTION

In the field of electronic commerce, also known as e-commerce, there are interactive websites that assist users in creating photo-based projects such as photo-books, photo-calendars, photo-cards, and photo-invitations. Such interactive websites allow users to upload photos and interact with the websites to create photo-based projects that are customized to user's preferences. Conventional photo-based project web sites, however, come with various drawbacks.

A common drawback with conventional photo-based project websites is the amount of time required by a user to create a photo-based project. A user often must participate in a variety of functions and processes in order to complete a photo-based project. For example, users usually must sort through the photos they desire to upload, remove the photos that are not adequate or properly focused, choose the photos to be uploaded, group photos together by topic or location, order the photos by chronological order, and crop or focus photos on the relevant portions of said photos. Performing the processes above can take an inordinate amount of time and can be tedious for users. Further, there are corrections and modifications that users often make to photos before they can be used in a photo-based project. For example, users often must correctly orient photos (landscape view as opposed to portrait view, for example), re-color photos or perform a color correction on the photos, remove red-eye from the eyes of photo subjects, and correct the photos for brightness or contrast. All of the corrections and modifications mentioned above require that the user open a special program or app, choose the photo to be corrected or modified, perform the correction or modification, and then save the newly modified photo. Again, performing the corrections and modifications mentioned above can be time-consuming and displeasure for users. As such, many users that log on to conventional photo-based project web sites often drop off or discontinue the process after a certain amount of time, without completing a purchase transaction.

Additionally, prior art products for a photobook creation are often based on a theme or stylistic parameter. However, they often do not have any bearing on the layouts used and on how photos are grouped together. Prior art products also lack a photo feature extraction, an object detection, and an analysis of photos to customize the photobook automatically for the user.

Prior art products also lack a layering of photos based on a photo feature extraction, an object detection, and an analysis. With such shortcomings in the prior art, an Internet user or customer may need to spend undue time and labor in customizing layouts, colors, themes, and captions of photos and texts to be able to finally design and print-by-order a satisfactory photobook. Undue time and labor in such a customization is a barrier to decide on an online purchase of a photobook. Such a barrier is also known as a "friction point." Such barriers or friction points are further compounded by unfriendly graphical user interfaces of prior art products and photo editing software, and result in additional inefficiencies and errors in printing a media-based product, such as a photobook. Such friction points result in loss of potential customers before the customers reach the point where they can order the media-based product for printing; sometimes a significant fraction of potential customers are lost in such friction points.

Therefore, there is a need to overcome problems with the prior art, and more specifically, a need for facilitating users during the process of creating media-based projects. A media-based project creation utilizes photos, videos, audio-videos, pictures, and/or text. As used herein, the phrase "photobook" shall be synonymous with any type of media-based product. The inventors have developed several unique solutions to the aforementioned problems associated with creation of media-based projects.

BRIEF SUMMARY OF THE INVENTION

In order to create a satisfying customer experience and create a photobook or other media-based product that is ready to go, in one embodiment, the invention mines photos, meta-data, use-case, and user data, to extract useful information that will allow the process described here to decide how best to auto-create the media-based product. In summary, three pieces of information, or any subset of this information, may be used to auto-populate the media-based product: (1) image analysis (including meta-data in images), (2) use case, and/or (3) user analysis.

In some embodiments, a server, communicably coupled with a communications network, for creating photo-based projects is disclosed. The server comprises at least one processor, at least one data repository having multimedia content, and a non-transitory physical medium for storing executable instructions for performing a method. The method includes executing instructions for establishing a client-server connection between the server and at least one user-operated computer connected to the network; receiving a plurality of images from the user-operated computer and storing said plurality of images in the data repository; performing photo analysis on the plurality of images in the data repository at the direction of the user-operated computer, wherein the photo analysis comprises one or more of: identifying similar images, identifying faces in the images, identifying objects in the images, identifying undesirable images, and identifying relevant portions of the images; performing automatic customization actions on the plurality of images based on results of said photo analysis at the direction of the user-operated computer, wherein the automatic customization actions comprises one or more of: grouping similar images, grouping images having identical faces, grouping images having identical objects, removing undesirable images, and cropping images to highlight relevant portions of said images; and, generating a printed product at the direction of the user-operated computer, wherein the printed product comprises the plurality of images placed in a particular page layout and pre-processed for printing or other digital or physical distribution.

Other embodiments of the present invention may utilize a use case identifier, representing a use case context of the printed product, as well as user data from social media platforms for optimizing the photo analysis and the automatic customization actions.

As a result, the book that the software builds is much more relevant and closer to being in a state in which the user would purchase the product. Many competitors offer photo book editors, but once a book is presented to the user, the user has to spent hours customizing layouts, colors, themes, and captions to get it to a point that the user is happy with it. Users dropping off a photo book service is a key reason why purchases are not made. This technology reduces the hurdles that customers (users) have to jump over and brings them closer to purchase. For example, in a wedding book, understanding where and what objects are in the photos, photos can be automatically cropped and positioned in a way that accentuates the book. A wedding cake can be specifically searched for since the process according to the present invention knows the context of the book being created. Once the wedding cake is found, the process can put all those photos with it onto one aesthetically-pleasing page. Other embodiments of the invention will be apparent from the detailed description below.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Glossary Definitions

Figure 1A:
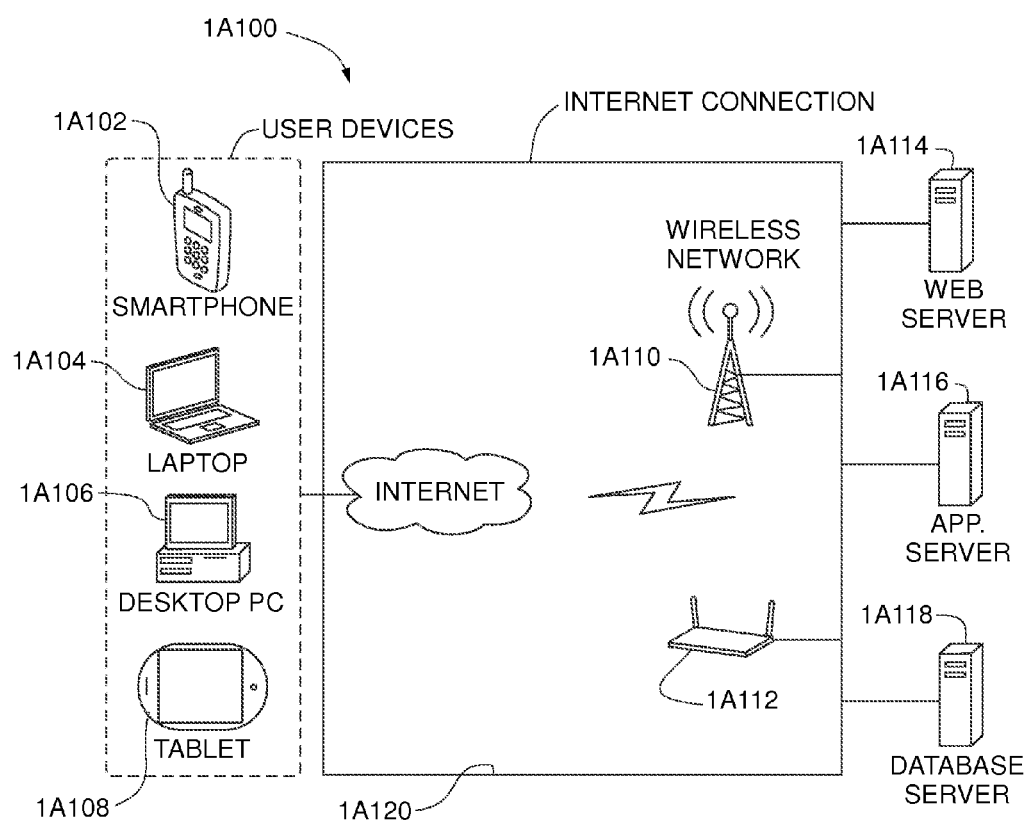
FIG. 1A is a network configuration diagram in which the present invention may be practiced.

The following terms shall have the below definitions throughout this specification and claims. The terms may be used in the form of nouns, verbs or adjectives, within the scope of these definitions.

"Project", "photo-based project", and "media-based project" is a computer-representation of a photo or multimedia based product that is worked on either collaboratively or singularly by one or more users, that is either printed and shipped physically, or delivered electronically to the one or more users "Communications network" is a collection of terminal nodes, links and any intermediate nodes which are connected so as to enable telecommunication between the terminals. The Internet is a widely communications network.

"Physical medium" refers to an article of manufacture in which computer program code may be stored, said program code later to be executed by a computer having at least one processor, such as a server.

"Data repository" refers to a central place, such as a database, where data is stored and maintained. It is also a logical (and sometimes physical) partitioning of data where multiple databases which apply to specific applications or sets of applications reside.

"Interface", "user interface", and "graphical user interface (GUI)" is a user interface (UI) in a display of a computer screen, where a user of a computer system can provide input.

"Client-server connection" is a connection between a sever and a user-operated computer via a communications network.

"User-device" and "user-operated computer" is a computer with a display, input options, a processor and a memory, often in the form of a laptop, desktop, tablet, smartphone, or the like.

"Image", "photo," and "photograph" shall be used interchangeably to refer to a digital image stored by the system.

"Multimedia content" refers to images and/or text.

"Visual content" refers to visual information in the images extracted by the system using automated photo analysis carried out by a processor.

"Media analysis," "photo analysis," and "image analysis" are all extraction of meaningful information from media files. These terms are used interchangeably to refer to an automated software and/or hardware process by which important features or salient features of the media files are identified, separated from background, extracted, and analyzed. Photo analysis in particular extracts useful information from digital images by means of digital image processing. In some embodiment, photo analysis comprises "feature extraction," in which specific features are extracted. Examples of features include, but are not limited to, scenery, faces, wedding cakes, people present, etc.

"Metadata" and "meta-data" is a set of data that describes and gives information about images. Meta-data also comprises data embedded in a digital image, which is known as EXIF (Exchangeable Image File Format) data.

"Customization actions" and "automatic customization actions" refer to any automatic editorial work performed automatically by the system to customize a design of a photo project. Examples of customization actions include, but is not limited to, matching images automatically to a use case specific theme, grouping similar images, grouping images having identical faces, grouping images having identical objects, removing undesirable images, cropping images to highlight relevant portions of said images, applying correction function on the plurality of images, and so on.

"Layout" and "page layout" specifies a number of photo/text slots and their position on a page.

"Printed project" and "printed product" refers to a photo-based project that is physically printed on a photo quality paper or canvas by a photo printing machine, such as, but not limited to, a photobook, a photocalendar, a photocard, and the like.

"Use case" refers to a use, context, or events related to a use of the finished printed project. Use cases may comprise a wedding, a night out, an event with friends, a baby, a year in review, a trip, a water-related event, a beach trip, a lake trip, a pool trip, a snow-related event, a ski trip, a road trip, and the like. A use case is any scenario in which the user will be ultimately providing images from.

"Embedded location metadata" refers to geo-location, identifying the geographical location of a person or device used to capture an image. A global positioning system may be used to detect the geographical location of the person or device at the time of image capture.

"Text box" is a slot or location in a page of a virtual canvas in which a target text or caption is positioned.

"User analysis" comprises behavioral observation of the user's inputs, interests, and choices, and any data relevant to the interest of the user. Such data can be obtained by the user's own inputs or by third party applications comprising social networking sites. User analysis is performed on the expected user of the finished product. User analysis can be manual inputs as well as automatic extractions.

"User data" refers to data obtained through user analysis. The user's interactions with the system and/or behavioral observations of the user by the system via user inputs create such user data.

"Social media platform" refers to social or professional networking sites. Such sites include, but are not limited to, FACEBOOK, TWITTER, LINKEDIN, and the like.

"Original media file" is a medial file that a user wants to upload from a computer to a server to create a media project, often in the form of videos, photos, or images. In general, "media" is any media handled by the system, which may include videos, photos, images, sound, text, and so on.

"Resized media file" is a media file with reduced size by either dimension or resolution as compared to an original media file, resulting in a smaller memory utilization compared to the original media file.

"Upload" is a process of electronically transferring digital media contents from one computer system, typically a client, to another computer system, typically a server.

"Background computer process" is a process that is not visible to a user of a user device while using the method of the present invention. It is a process that happens outside the visibility of user interfaces; it occurs primarily between a memory of a user device and a server, via a communications network.

"Edit process" is a process that a user partakes to modify a project using the interface.

"Widget" refers to a separate or built in software application that is created by computer codes to facilitate image uploading from a user device to a server.

"Exchangeable Image File Format" (EXIF) is a standard that specifies the format for images, sound, and ancillary tags used by digital cameras (including smartphones), scanners and other systems handling image and sound files recorded by digital cameras.

"Analytical data" refers to the data extracted from an image or media file after a server performs image analysis or media file analysis.

"Illusionary impression" is an artificial impression of having a job (upload in this case) completed when the job is actually not completed. This occurs because the job (upload in this case) is happening in the background computer process.

"Undesirable media file" refers to any low quality media files that should be removed. Undesirable media files are often too poor to be used in a photo project creation process, and include blurry, dark, or overexposed photos, and the like.

"Workspace" is an editor or a place at an interface where a user can edit or customize a project.

"Unduly large sized media file" refers to an extremely large media file, the size of which may not be necessary in creating a media project.

"Thumbnail" refers to a smaller representation of a larger image. A thumbnail may comprise meta-data of an image, or may be embedded in EXIF data.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification is not necessarily all referring to the same embodiment, nor is a separate or alternative embodiment mutually exclusive of other embodiments. Moreover, various features are described which may be exhibited by some embodiments and not by others. Similarly, various requirements are described which may be requirements for some embodiments but not other embodiments.

Overview

First, various uploading improvements for use with some embodiments of the present invention are disclosed. The upload embodiments are utilized to transmit from the user to the server images of sufficiently high-resolution to be usable in the image analysis processes of the present invention, but not of such high-resolution that the associates large file sizes create a bottleneck for the customer experience and purchase process. Next, various embodiments of the present invention in which image analysis, use-case, and user analysis is performed to auto-generate an appealing photobook or other media-based product are disclosed. Finally, numerous alternative and illustrative embodiments of the present invention are disclosed.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, examples, and/or flow diagrams in order to avoid obscuring the invention.

Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Improved Uploading Embodiments

Broadly, embodiments of the present invention relate to systems and methods for customizing media-based projects, such as, a photobook. Generally, to create a photobook online, a user needs to select photos from a user-device, such as a laptop or mobile device. Once the photos are selected, the photos are uploaded to a server. The server then provides essential tools to the user-device to build the photobook. However, uploading a plurality of photos or images of large sizes, but quickly providing essential tools to a user to build a photobook is an unsolved problem not addressed by prior art products. A significant reduction in time for upload is necessary so that a user may get a pleasant experience in being able to quickly build and order a photobook, without needing first to wait for the images of large sizes to upload to the server and then only start customizing the book. One prior art photo uploading method teaches a user to wait for a completed upload to take place before customizing the book, in which the wait is burdensome and distracting to the user, significantly degrading user experience. Prior art products have not been able to resolve the issue of reducing a total time it takes to build a photobook when too many images of large sizes are involved in an upload.

A server operates within a client-server architecture of a computer system. A server comprises computer hardware and software to serve computational requests of other programs or clients. A client comprises a user-device, such as, a laptop, a smartphone, or a desktop PC. A server performs tasks on behalf of clients. A server often provides services via the Internet or other network.

The present invention addresses and solves the problem of media file uploading that was not resolved by prior art products or publications. Media files comprise audio files, video files, image files, and/or text files. The present invention improves media file uploading experience from a user-device to a server for creating online media-based projects. A user-device is an electronic device comprising a processor, a display, a memory, and an input means. Examples of user-devices include smartphones, laptops, desktop personal computers, tablet computers, and the like. User-devices are connected to the Internet for creating media-based projects online.

Advantageously, the present invention improves media file uploading experience of an Internet user, in which a user-device renders an illusionary impression of a completed upload of media files from the user-device to the server, while the media files are still uploading to the server. The invention eliminates a need for the user to wait for an upload to complete before customizing or finalizing the media-based project. In some embodiments, the invention also eliminates a need to wait for the upload to complete before the user can purchase or order the media-based project.

In some embodiments, the media-based project comprises a physical manifestation of the project, resulting in a printed photobook, photo album, or other physical manifestation of the project. A photobook may be printed on a canvas or photo quality paper and bound together as a book. The media-based project also includes an online product comprising: audio, video, image and text—all packaged together as a single cohesive item or product for display or sharing through online means or electronic means, or for ordering a physical version of said online product.

A media-based project is not limited to a photobook. A photobook is a physical manifestation of the project in the form of a printed product. A physical manifestation may not be necessary in other embodiments, such as, an online video album, or an online photo album, and/or combinations thereof. In the description that follows, a photobook is used as a representative of any type of media-based project.

MONTAGE™, MOSAIC™, and MIXBOOK™ are trademark names carrying embodiments of the present invention, and hence, the aforementioned trademark names maybe use collectively or interchangeably used in the specification and drawings to refer to the products/services offered by embodiments of the present invention. Because all of the products are created from media-files using a graphical manipulation system provided by the inventors as a network-based software application, the relative terms descriptive of the overall process and for the providing company are MONTAGE™, MOSAIC™, and/or MIXBOOK™. The terms MONTAGE™, MOSAIC™, and/or MIXBOOK™ may be used in this specification to describe the overall media-based product creation and editing process of the invention, the website, mobile app, or web-app through which the process is made accessible to authorized users, and/or the service-providing company. With reference to the figures, embodiments of the present invention are now described.

FIG. 1A shows a schematic diagram of a network configuration 1A100 for practicing embodiments of the present invention (this embodiment is sometimes known as "MONTAGE"). A user-device or devices may be connected to the Internet using a wireless network or wired network. A user-device may be a smartphone 1A102, laptop 1A104, desktop PC 1A106, or tablet 1A108. The wireless network comprises a cellular tower 1A110, or a wireless router 1A112. User-devices are connected to servers comprising a web server 1A114, an application server 1A116, and a database server 1A118. The servers are connected to a user-device through the wireless network, or the wired network 1A120. The wired network 1A120 or the wireless network may employ technologies and protocols comprising Ethernet technology, Local Area Network (LAN), Wide Area Network (WAN), and optical network, and the like.

Figures 1, 1B:
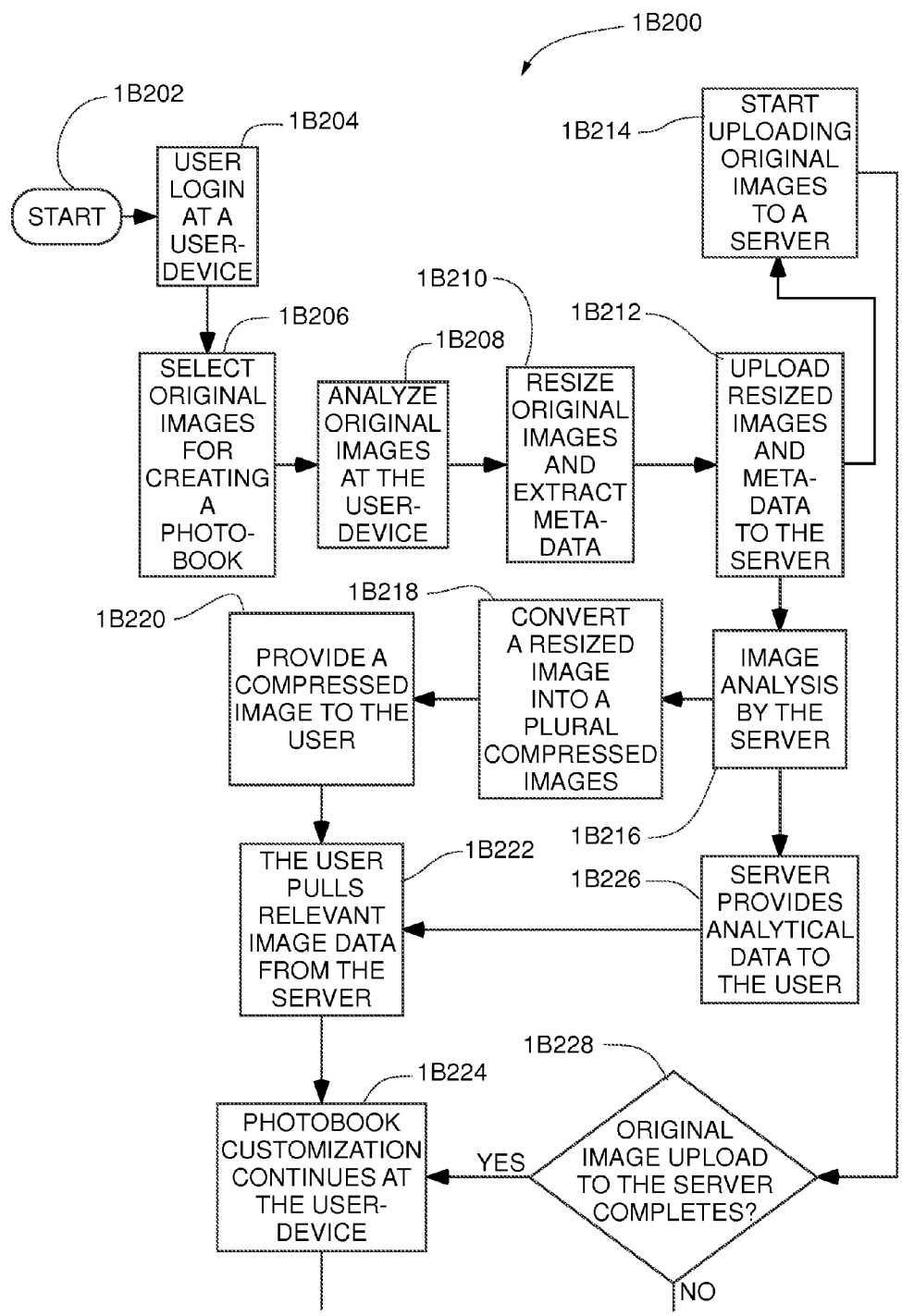
FIGS. 1B-1 and 1B-2 comprise a flow diagram showing a method of background uploading of media files, according to one embodiment of the invention.
Figures 1, 1B, 2:
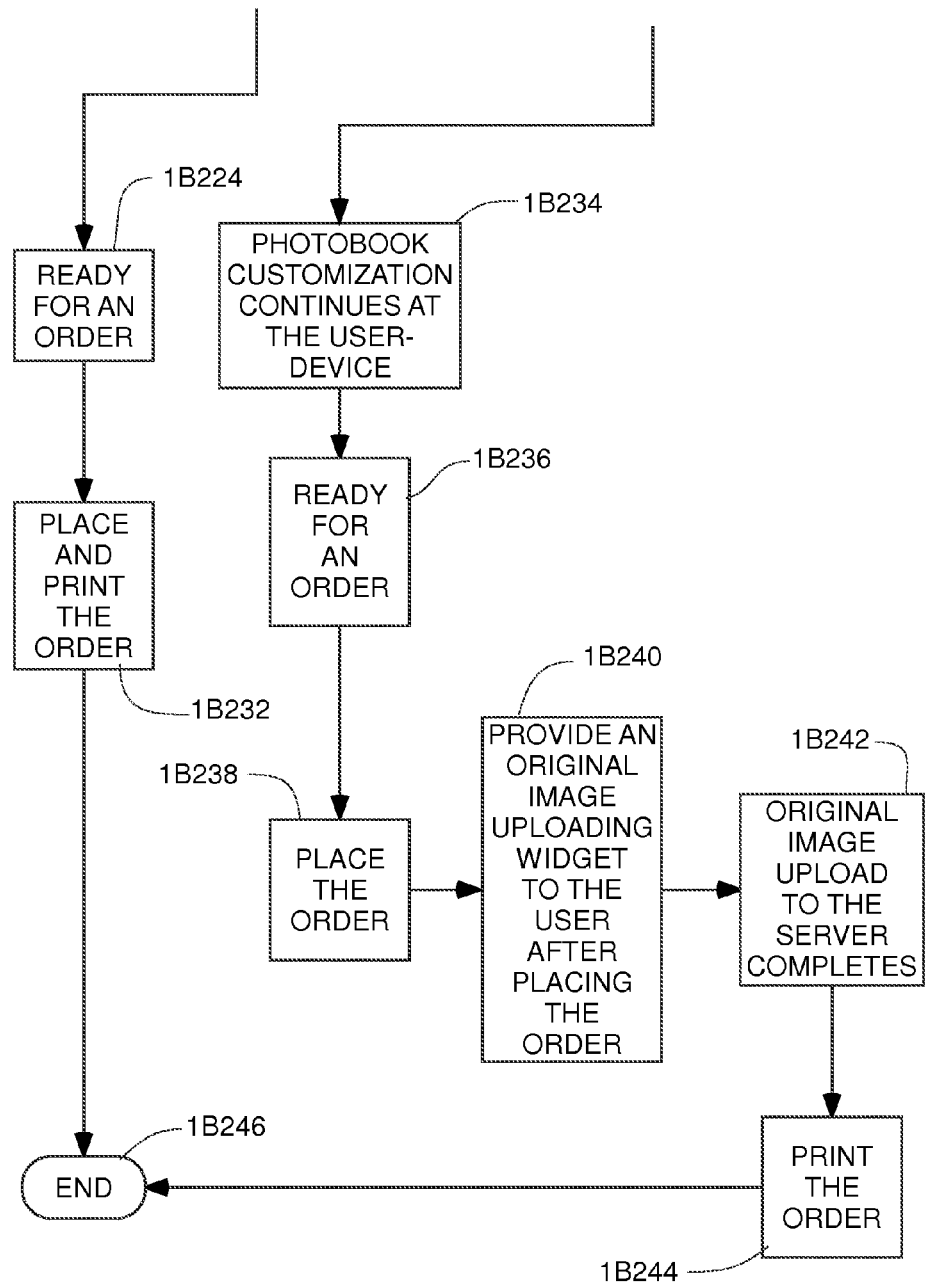

FIGS. 1B-1 and 1B-2 show a flow diagram of an exemplary embodiment 1B200 showing a method of background uploading of media-files while an Internet user is customizing a media-based project, which in this embodiment is a photobook. An Internet user (hereinafter "user") starts the process of creating a media-based project (hereinafter "project") using a user-device at step 1B202. The term photobook or project may be used interchangeably. The user logs in at step 1B204 using the user-device. After the user logs in at the user-device, at step 1B206 the user selects original media files or images for creating a photobook. At step 1B206, following the log-in process at the user-device, the user is provided a workspace (also called "editor") where the user can practice or utilize various embodiments of the present invention to customize, edit or create the photobook. After the selection of images is made, then at step 1B208, optionally and in some embodiments, the client-device analyses the images. Once the optional image analysis is completed at the client-device, at step 1B210 the original images are resized to smaller sized image files and a meta-data is extracted from each original image. Meta-data is a type of data that is relevant to or embedded in an image. Meta-data comprises digital data about a media file. In one embodiment, meta-data is an Exchangeable Image File format data, or "EXIF" data (also in some cases known as "Exif" data). EXIF is a standard that specifies a format for images, sound, geolocation data (provided by a Global Positioning Receiver or GPS receiver attached to a camera), and ancillary tags used by digital cameras, smartphone cameras, scanners, and other systems that handle image and/or sound files recorded by digital cameras. EXIF data comprises a broad spectrum of data, including, but not limiting to, date and time information of images taken, GPS location of images, camera settings (camera make and model, image orientation or rotation, aperture, shutter speed, focal length, metering mode, and ISO information), a thumbnail of the image, a description of the images, and/or copyright information thereof.

At step 1B212, the resized image files and the meta-data are uploaded to the server. The resized image files are smaller in size as compared to the larger sized original images, but not so small as to be un-useable by the server for image analysis. The resized images are immediately provided to the user-device for building the project. After the resized images and the extracted meta-data of the original images are uploaded to the server, step 1B214 will follow to begin uploading the original images to the server in a background computer process at the user-device. Using the uploaded resized images and the meta-data, at step 1B216, the server performs a server-side image analysis. An image analysis comprises image optimization algorithms, image ranking algorithms, feature or object detection algorithms, use case formation techniques, layout, and/or photobook design formation techniques, as described in greater detail below. Once the server-side image analysis is completed, at step 1B218, the server converts the resized uploaded media files into multiple sizes or multiple (plural) compression levels (the term "compressed media file" or "compressed image" is used herein to refer to a media file that has been in some way modified by the server and of a different size from the resized file uploaded from the client to the server). At step 1B220, the server provides to the user-device a compressed image, or an image of a size relevant to the scope of the project (photobook). The server converts a resized image into many different sizes (called "compressed files" herein) so that each size may be called by the user-device depending on the scope of the project. The scope of the project may comprise different sizes and different resolutions of image files, wherein the server performs the server-side image reduction to prepare images of different sizes as needed by the project. While the server performs the server-side image reduction using the resized image files, the original image files are still uploading in the background computer process. At step 1B226, the server provides analytical data to the user. At step 1B222, the user pulls relevant image data comprising image files and analytical data from the server. At step 1B224, the user continues customizing (building) the photobook or project. At step 1B228, the original image files may or still may not be uploaded [completed upload] to the server. If the original image files are uploaded to the server, the user continues building the photobook as shown by step 1B224. If the original image files are not uploaded, the photobook customization still continues at step 1B234. If the original image files are uploaded and the photobook customization continues (and thus completes), the photobook will be ready to order at step 1B224. At step 1B232, the user can place an order to print the photobook. Once the photobook is ordered and printed at step 1B232, the embodiment 1B200 ends at step 1B246.

In the event that the upload of the original images is not complete, the user still customizes (and thereby completes) the photobook at step 1B234, and is ready to order the photobook at step 1B236. The user places the order at step 1B238. Once the order is placed at step 1B238 and the original images are still not uploaded, the embodiment 1B200 provides the user a widget to upload [begin a new upload or complete the ongoing upload] the original image files that the user selects. Step 1B238 allows the user to order the photobook before the upload of the original image files completes. At step 1B240, the embodiment 1B200 provides the user an optional uploading mechanism of original image files if the user does not have time to wait until the original images are uploaded to the server before placing an order to print the photobook. However, in another embodiment, step 1B240 can happen before step 1B238 and/or before the step 1B236; that is, a widget to upload original images may be provided to the user-device before placing an order, or before the order is ready. In other words, steps discussed herein may be switched, overlapped, or altered as long as the spirit of the present invention is consistent with the plurality of embodiments described herein. An uploading widget may comprise a software application that the user can download from an embodiment of the present invention. Once the widget is downloaded and installed at the user-device, the user can begin uploading or continue uploading the original image files using the installed widget. At step 1B242, the original image files are uploaded to the server with the aid of the widget. After the original image files are uploaded to the server, at step 1B244 the server can send the order to print the finished product. The embodiment thereby ends at step 1B246.

Figure 1C:
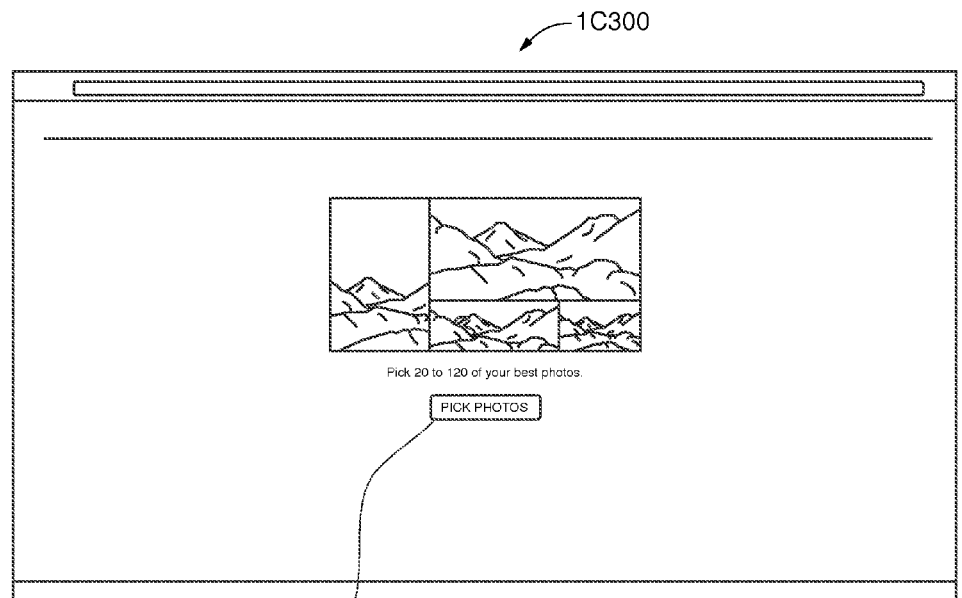
FIG. 1C is a diagram showing a method of selecting media files, according to one embodiment of the present invention (this embodiment sometimes known as "MONTAGE").

FIG. 1C is a screenshot embodiment 1C300 showing a method of selecting original media files or images at a user-device. In the embodiment 1C300, a user-device may select original images by clicking a button 1C302, labeled as, for example, pick photos. A button is a soft-button in a software embodiment. The words "image(s)" and "photo(s)" are used interchangeably in this specification.

Figure 1D:
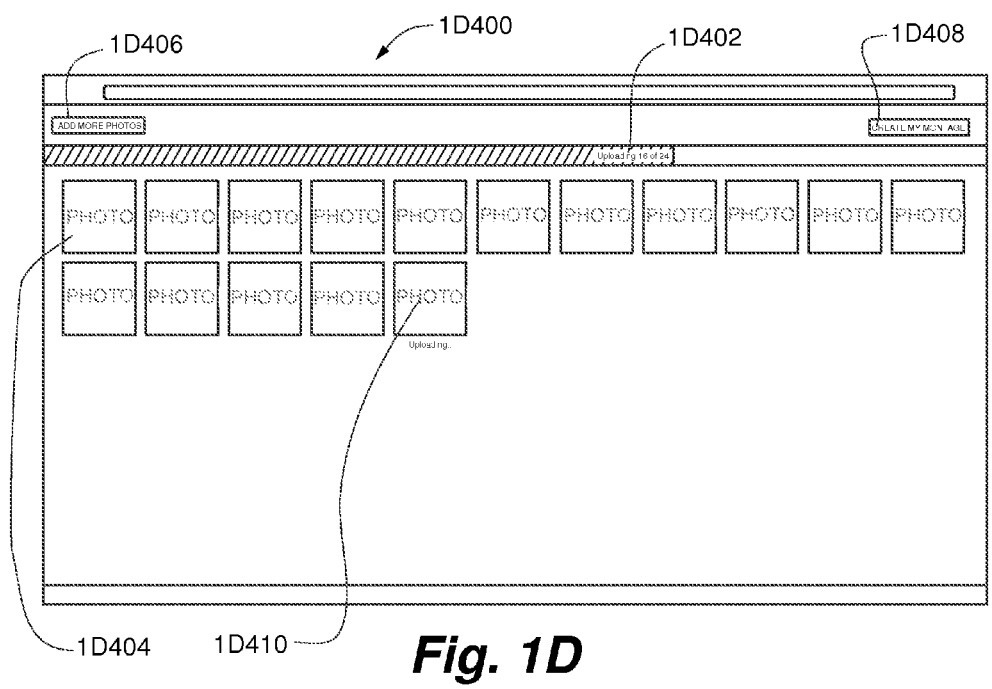
FIG. 1D is a diagram showing a method of uploading media files, according to one embodiment of the invention.

FIG. 1D is a screenshot embodiment 1D400 showing an upload of original images to a workspace of a user-device after the user-device selects or picks images. A workspace at a user-device is also called an editor. A progress bar 1D402 shows the number of images uploaded or uploading to the workspace. An uploaded image 1D404 is displayed in the workspace. The embodiment 1D400 also shows an uploading image 1D410 when the image is being uploaded. The embodiment 1D400 demonstrates client-side resizing of original image files. The image 1D404 is a resized image which is smaller than the original image. A button 1D406 allows the user to add more images. After the selected images are uploaded to the workspace of the client-device, the user can click a button 1D408 to create a design of a photobook using the uploaded photos in the workspace. The button 1D408 reads "create my Montage," where MONTAGE is a trademark name, but not a functional name, of the button 1D408.

Figure 1E:
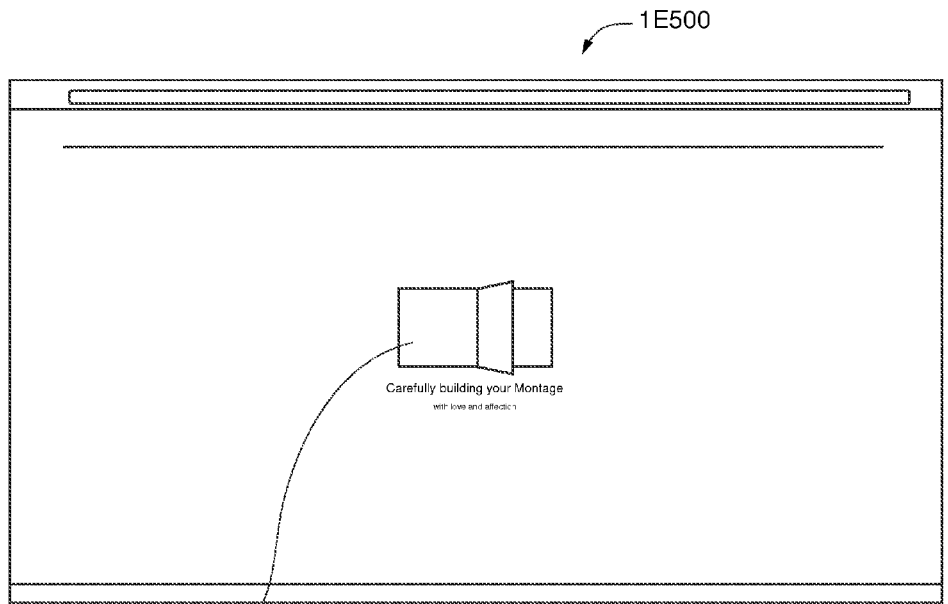
FIG. 1E is a diagram showing a method of building a media-based project, according to one embodiment of the invention.

FIG. 1E is a screenshot embodiment 1E500 in which the present invention does an analytical work or analysis work to build a photobook. An exemplary symbol 1E502 teaches that the present invention is building a photobook by performing the analytical work or analysis work, such as an image or video analysis.

Figure 1F:
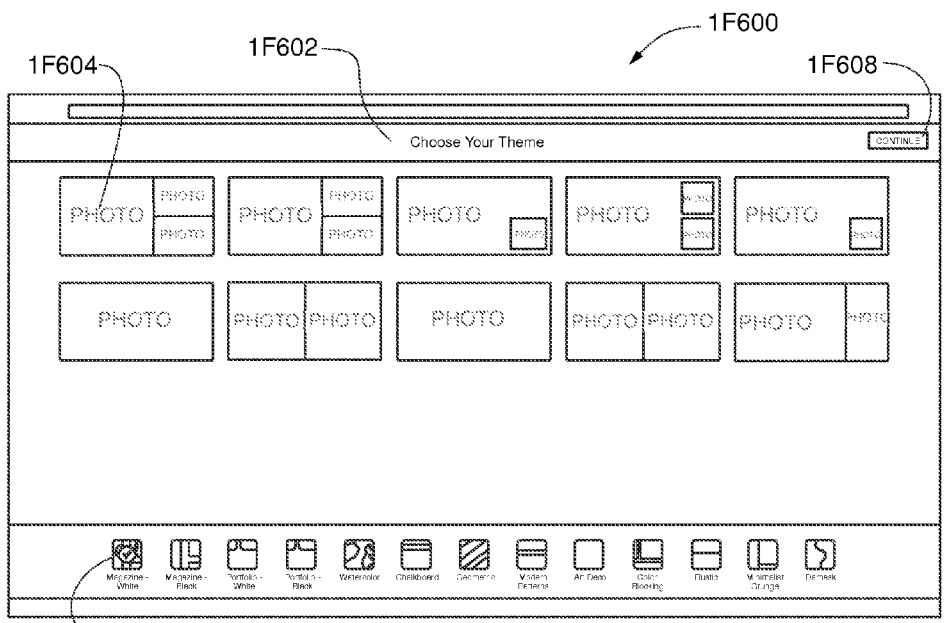
FIG. 1F is a diagram showing a method of selecting a theme, according to one embodiment of the invention.

FIG. 1F is a screenshot embodiment 1F600 that displays a theme selection of a project or photobook after images are uploaded to the workspace (editor) of a user-device. All pages of the photobook are displayed in the workspace. In a page 1F604 of the photobook, an arrangement of the images is shown. This arrangement is auto-populated by the present invention after an image analysis. The server performs the image analysis for auto-populating the arrangement. For auto-populating the design of the book, the server may use features such as, cropping, zooming, relevant images grouping, and other image editing processes. The embodiment 1F600 allows the user to select a theme 1F606. The instruction at 1F602 allows the user to select or choose the theme 1F606. Once the user is satisfied with the theme and arrangement of the images in all pages of the photobook, the user can click the button 1F608 to continue to the next step of the present invention.

Figure 1G:
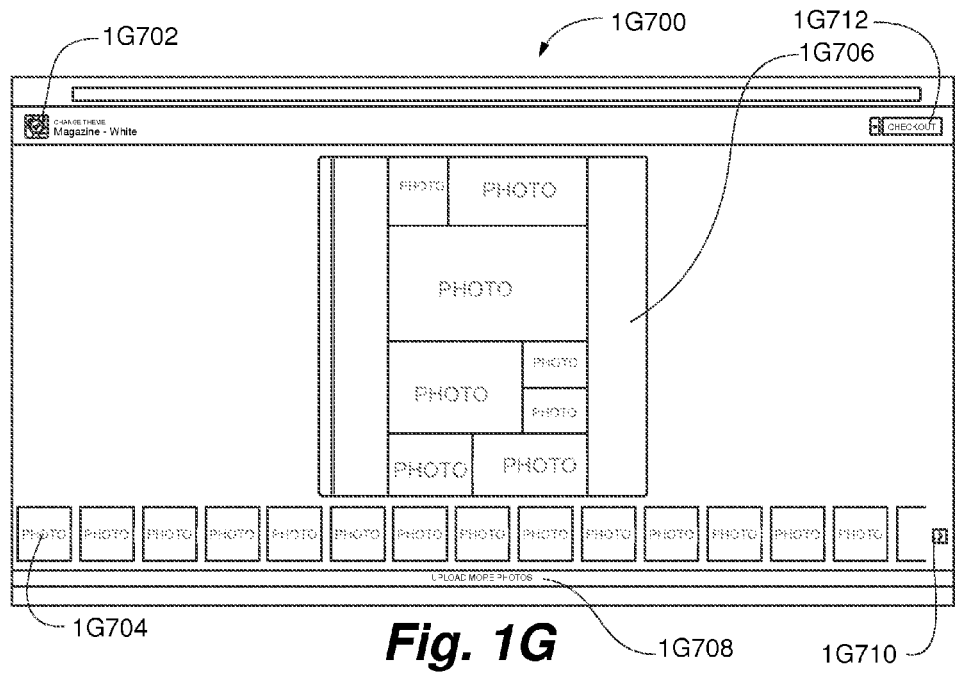
FIG. 1G is a diagram showing a method of designing a cover sheet, according to one embodiment of the invention.

FIG. 1G is a screenshot embodiment 1G700 that shows a cover page of a photobook and an arrangement of images therein. The cover page 1G706 uses at least an image 1G704. A plurality of images can be used in the cover page 1G706. A server auto-populates a first design of the cover page 1G706. The user has an option to further customize the cover page 1G706 by using any of the uploaded images. Standard image editing features may be applied in customizing each image on the cover page 1G706 of the photobook. The workspace displays the theme of the design at 1G702. The workspace further allows the user to upload more photos at 1G708. The button 1G710 allows the user to scroll the uploaded images. A checkout button 1G712 allows the user to order and print the photobook.

Figure 1H:
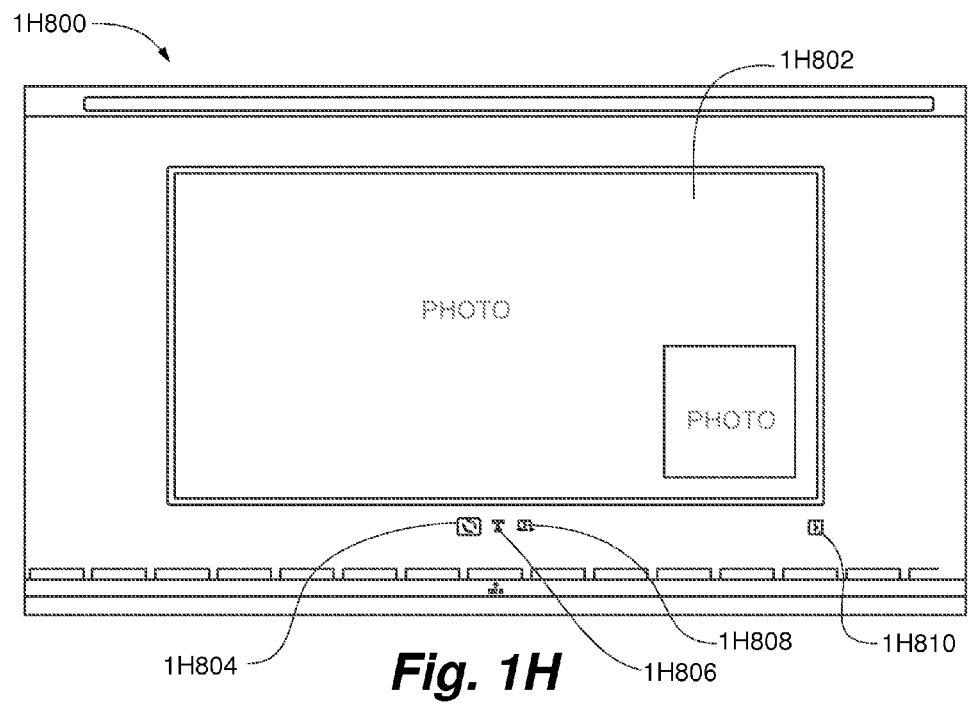
FIG. 1H is a diagram showing a method of arranging text and images, according to one embodiment of the invention.

FIG. 1H is a screenshot embodiment 1H800 that shows a page of a photobook for rearranging text and images therein. The page 1H802 shows an arrangement of the uploaded images on the page. The user can shuffle images on the page 1H802 by using a shuffle button 1H804, insert text on the page 1H802 by using a insert-text button 1H806, and rearrange pages of the book by using a rearrange button 1H808. The user can additionally use one or more of the uploaded images to customize the design of the page 1H802. The user can flip to a next page of the book by clicking or pressing an arrow button 1H810.

Figure 1J:
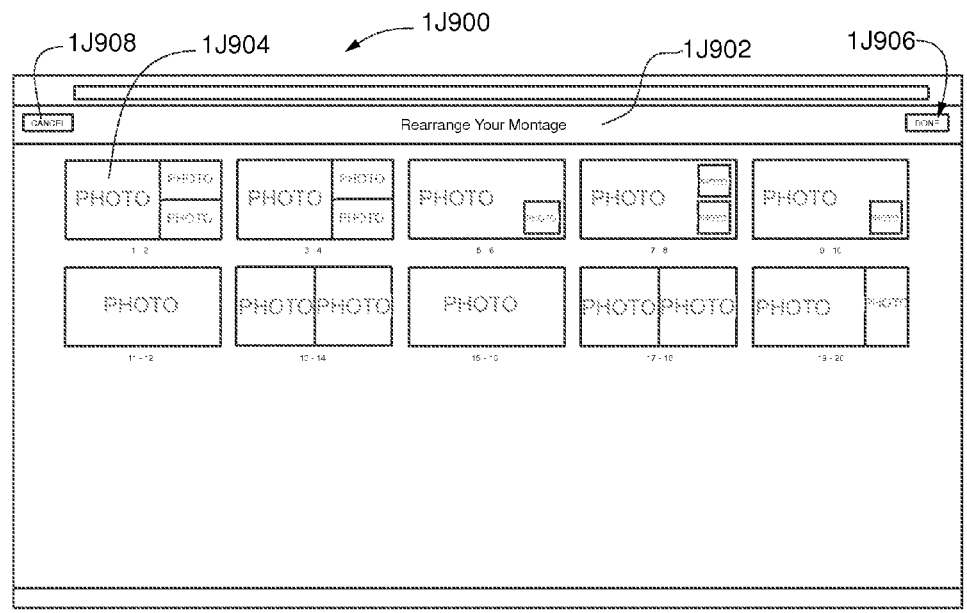
FIG. 1J is a diagram showing a method of previewing a design, according to one embodiment of the invention.

FIG. 1J is a screenshot embodiment 1J900 showing a method of previewing and rearranging design pages of a photobook. A design page 1J904 has a theme and at least an image. A plurality of images can be used in the design page 1J904 and the theme is selected by the user. In the embodiment 1J900, the design page 1J904 comprises page 1 and page 2 of the photobook. The message at 1J902 explains that the workspace provides a method to rearrange the pages of the photobook. There is a cancel button 1J908 to cancel a rearrangement if desired. Once a rearrangement of pages is completed, the user can click a done button 1J906 to save the rearrangement.

Figure 1K:
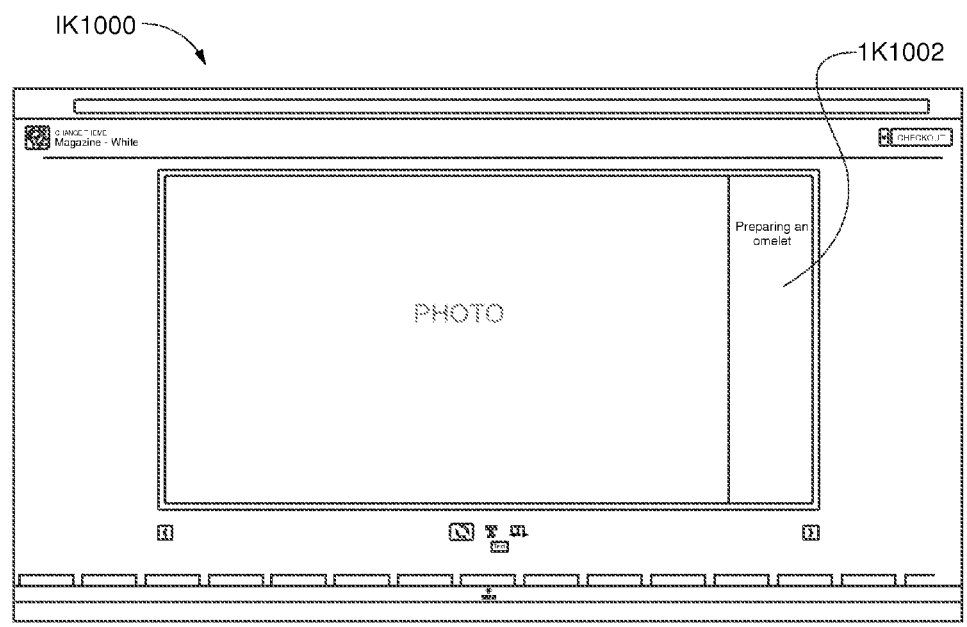
FIG. 1K is a diagram showing a method of inserting text, according to one embodiment of the invention.

FIG. 1K is a screenshot embodiment 1K1000 showing an insertion of text to describe an image. Text can be inserted into a page of the photobook to describe an image or a group of images. A storyline or narrative of work may be added with images using text. A narrative can be added as shown in the region 1K1002.

Figure 1L:
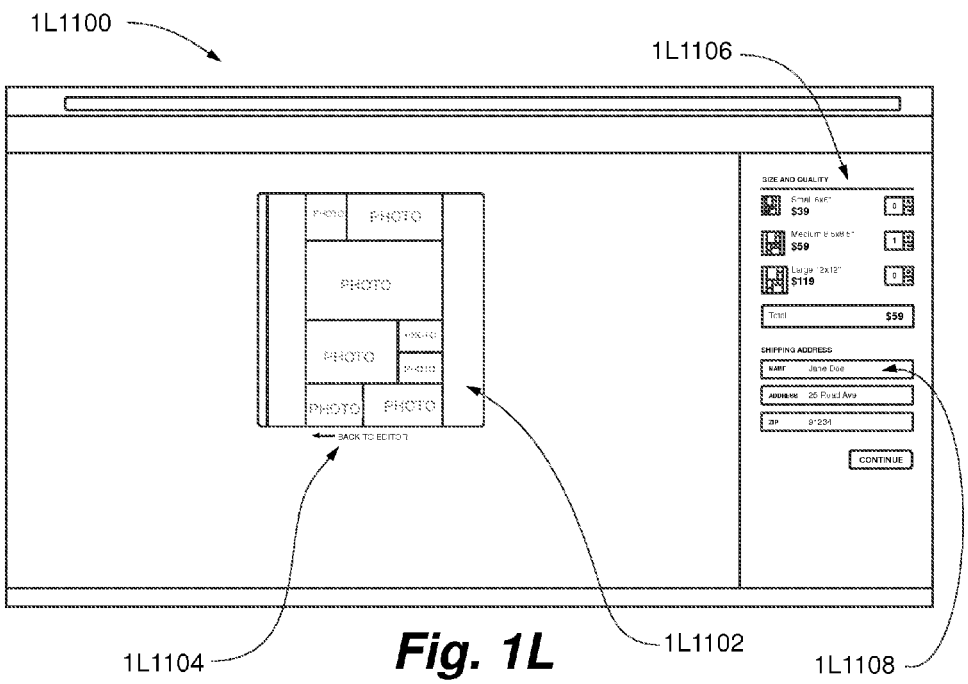
FIG. 1L is a diagram showing a method of ordering a photobook, according to one embodiment of the invention.

FIG. 1L is a screenshot embodiment 1L1100 showing a method of ordering a project or photobook. Once a photobook 1L1102 is customized and ready to order, a user can select a specification of the project to order. If the user is not happy with the customization of the photobook 1L1102, the user can go back to the editor or workspace by clicking 1L1104 to further edit/customize the pages of the photobook. A specification may be a size or dimension of the photobook. A sample specification of the project by size or dimension is shown at 1L1106. Each specification may have a different price for order. When the user agrees to a price, the user can enter a shipping address as shown at 1L1108. The user can further continue with payment options and order a printed photobook. A standard payment processing gateway maybe implemented in the present invention to order a printed copy of the photobook.

Figure 1M:
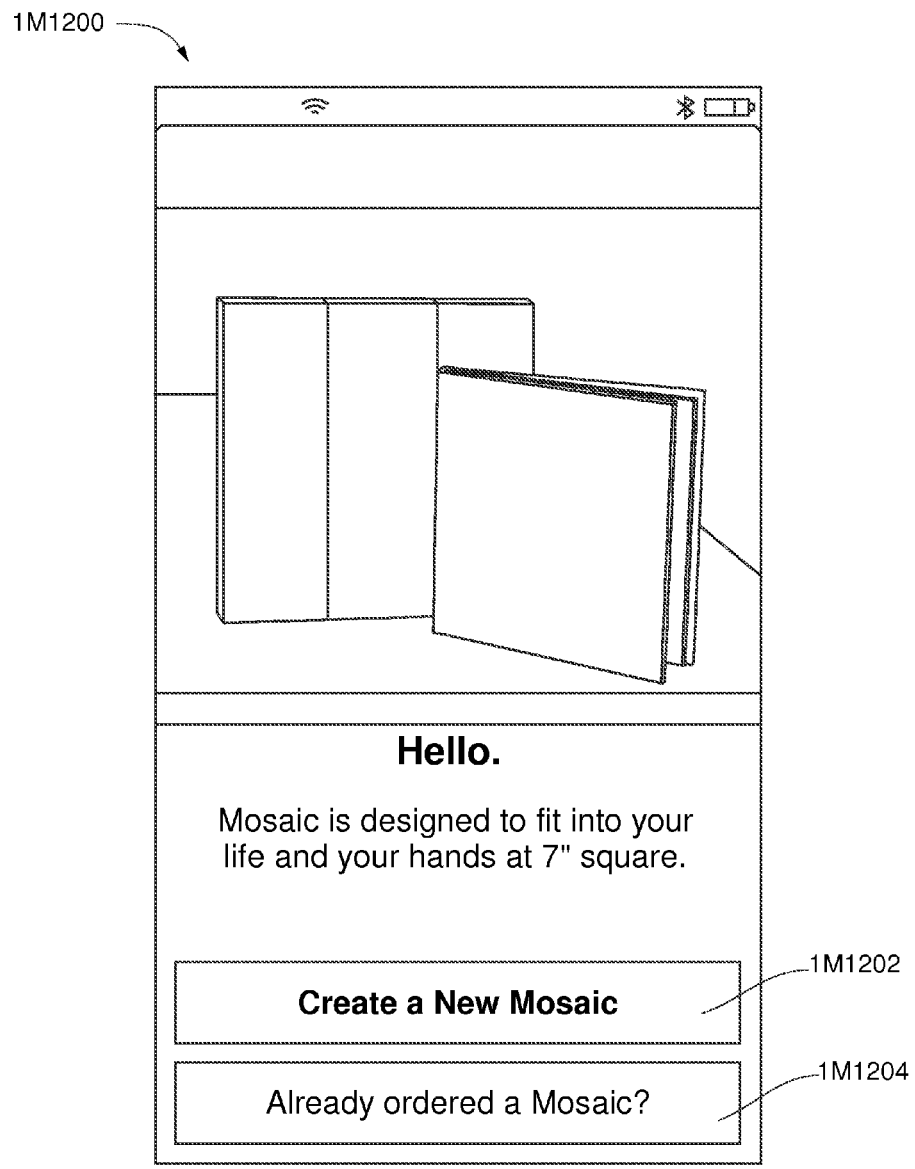
FIG. 1M is a diagram showing a mobile embodiment of a login screen of the present invention, according to another embodiment of the present invention (this embodiment sometimes known as "MOSAIC").

FIG. 1M is a screenshot embodiment 1M1200 showing a log-in screen at a handheld device or mobile device, such as, a smartphone (this embodiment is sometimes known as "MOSAIC"). A user can create a new user account by clicking a button 1M1202. An existing user can log-in to create a new project by clicking a button 1M1204. In the embodiment 1M1200, the word MOSAIC is a trademark name of an embodiment of the present invention, but not a functional name to describe a method or process.

Figure 1N:
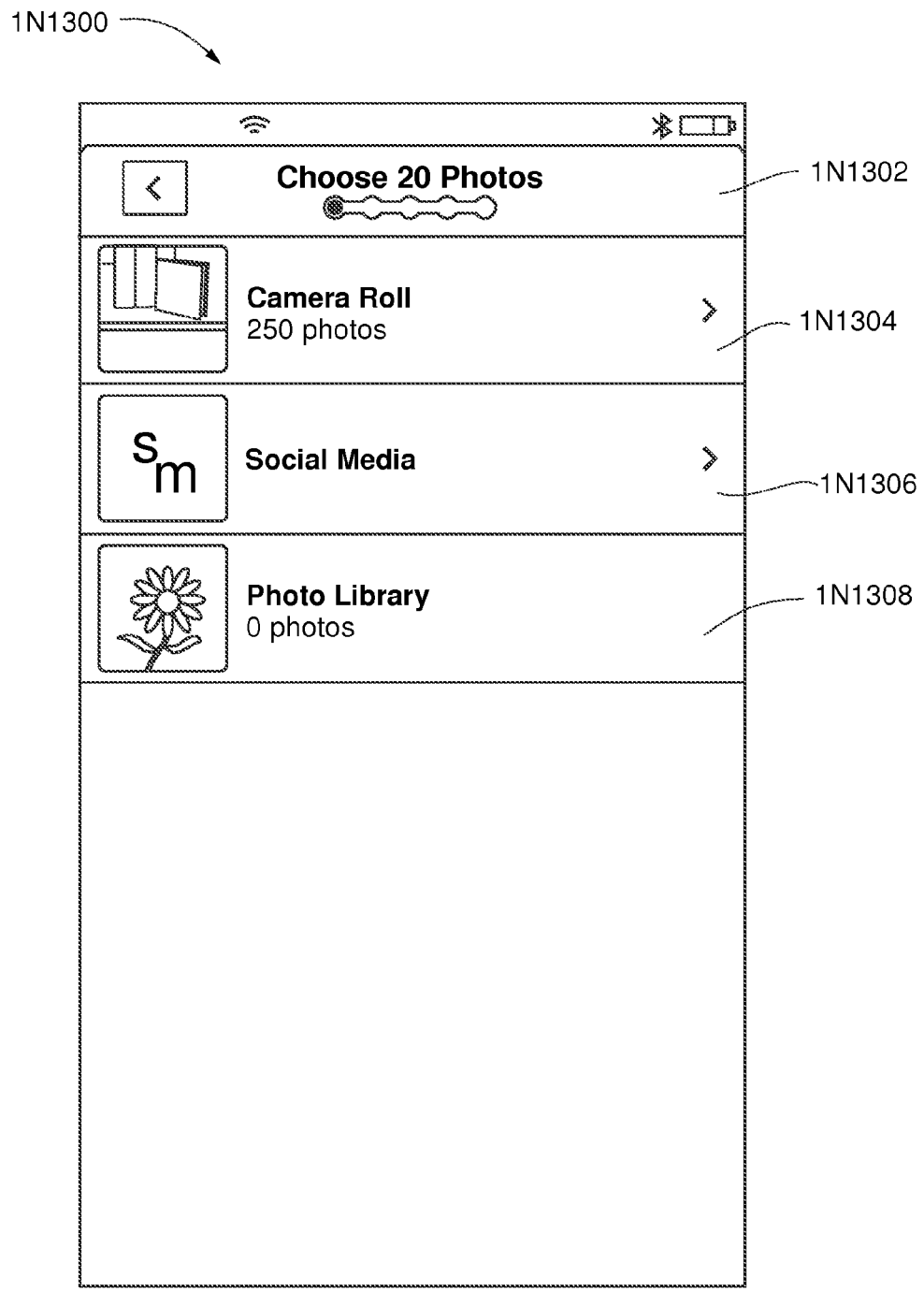
FIG. 1N is a diagram showing a method of media file selection at a mobile device, according to one embodiment of the invention.

FIG. 1N is a screenshot embodiment 1N1300 showing a method of selecting image files from multiple sources at a handheld or mobile device for creating a project. A method of selection 1N1302 shows a listing of sources where media files may be located. Image files or media files may be selected from a folder camera roll 1N1304, from a social media 1N1306, or from a photo library 1N1308. Camera roll 1N1304 is a file folder where images taken by a camera of the mobile device are stored. Social media 1N1306 comprises outside websites where image or media files are stored, such as, but not limited to, FACEBOOK™, TWITTER™, and MYSPACE™. Photo library 1N1308 is a file folder where the user can store image files at the mobile device.

Figure 1P:
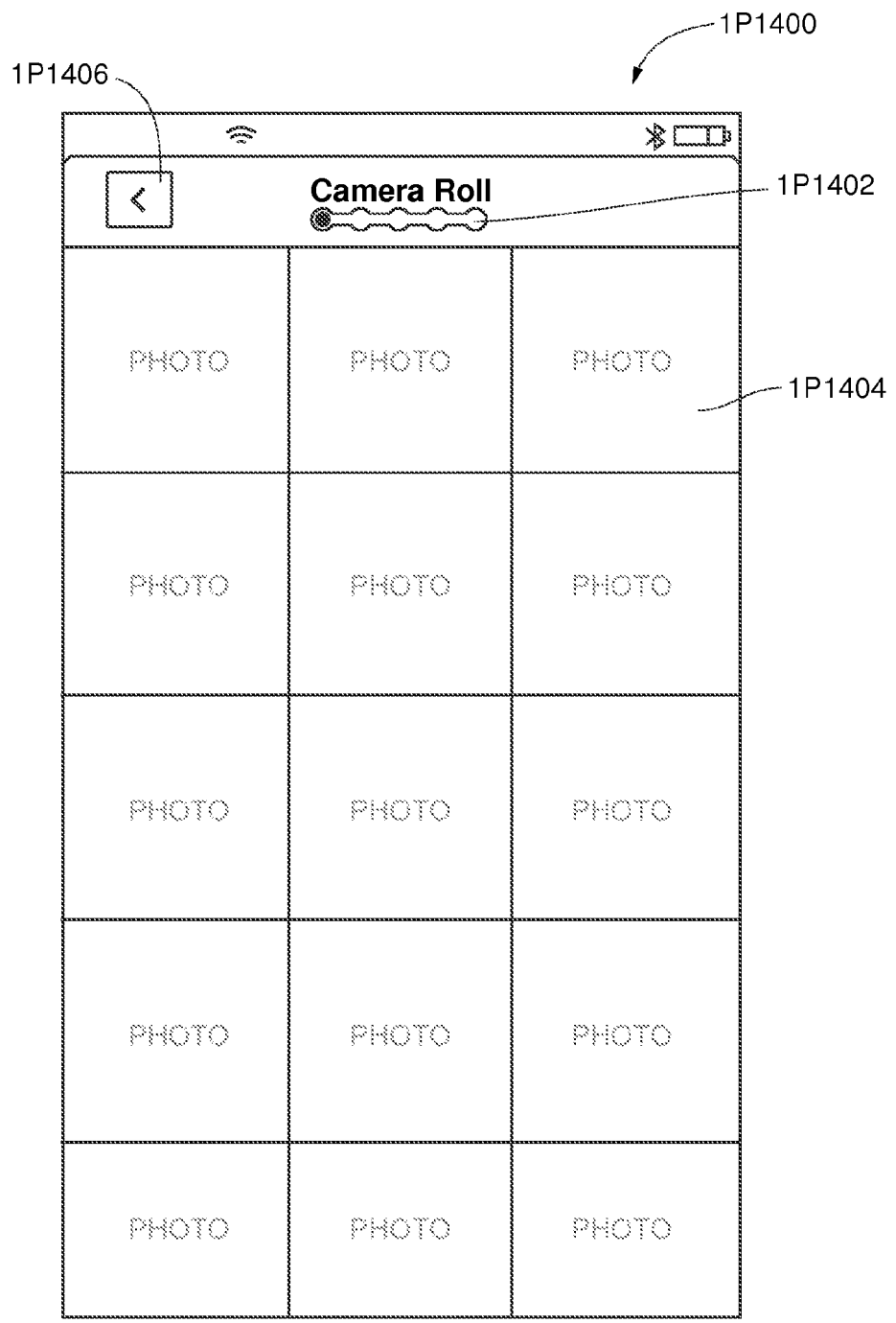
FIG. 1P is a diagram showing a preview of images at a mobile device, according to one embodiment of the invention.

FIG. 1P is a screenshot embodiment 1P1400 showing a preview of an image file folder at a mobile device. The folder 1P1402 with an exemplary name of camera roll, when selected by a user, the mobile device will show a preview of all images stored in the folder. An image 1P1404 is a preview of an original image. The user can go back to a different file folder at the mobile device by clicking or pressing a back button 1P1406.

Figure 1Q:
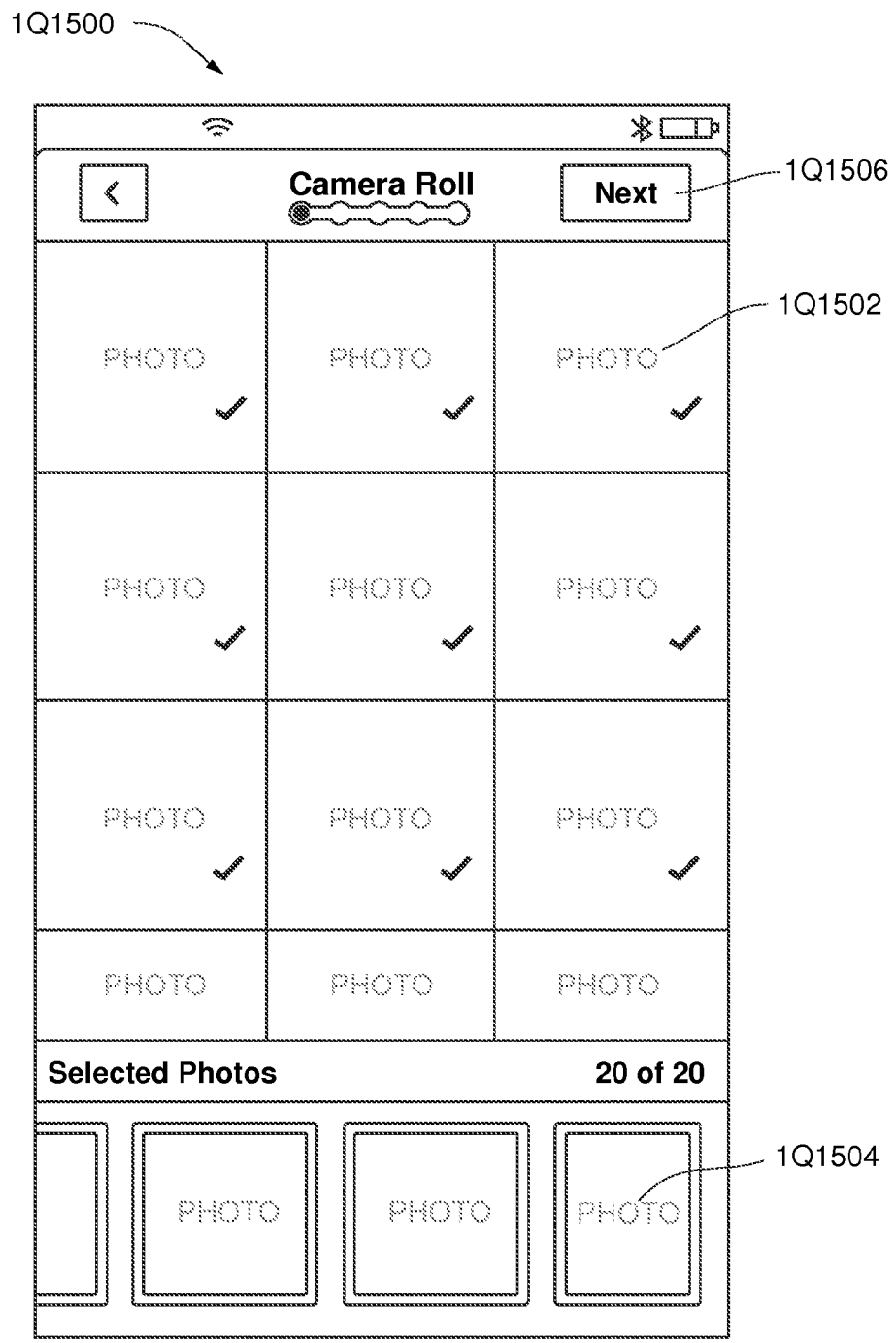
FIG. 1Q is a diagram showing image selection at a mobile device, according to one embodiment of the invention.

FIG. 1Q is a screenshot embodiment 1Q1500 showing images selected by a user at a mobile device. An image 1Q1502 may be selected by the user by touching, pressing, or clicking the image 1Q1502. Once the image 1Q1502 is selected, the selection is confirmed by a check mark as shown within the image 1Q1502. A preview 1Q1504 of the selected image is generated once the image is selected. Once images are selected for building a project, the user can press a next button 1Q1506 to build the project.

Figure 1R:
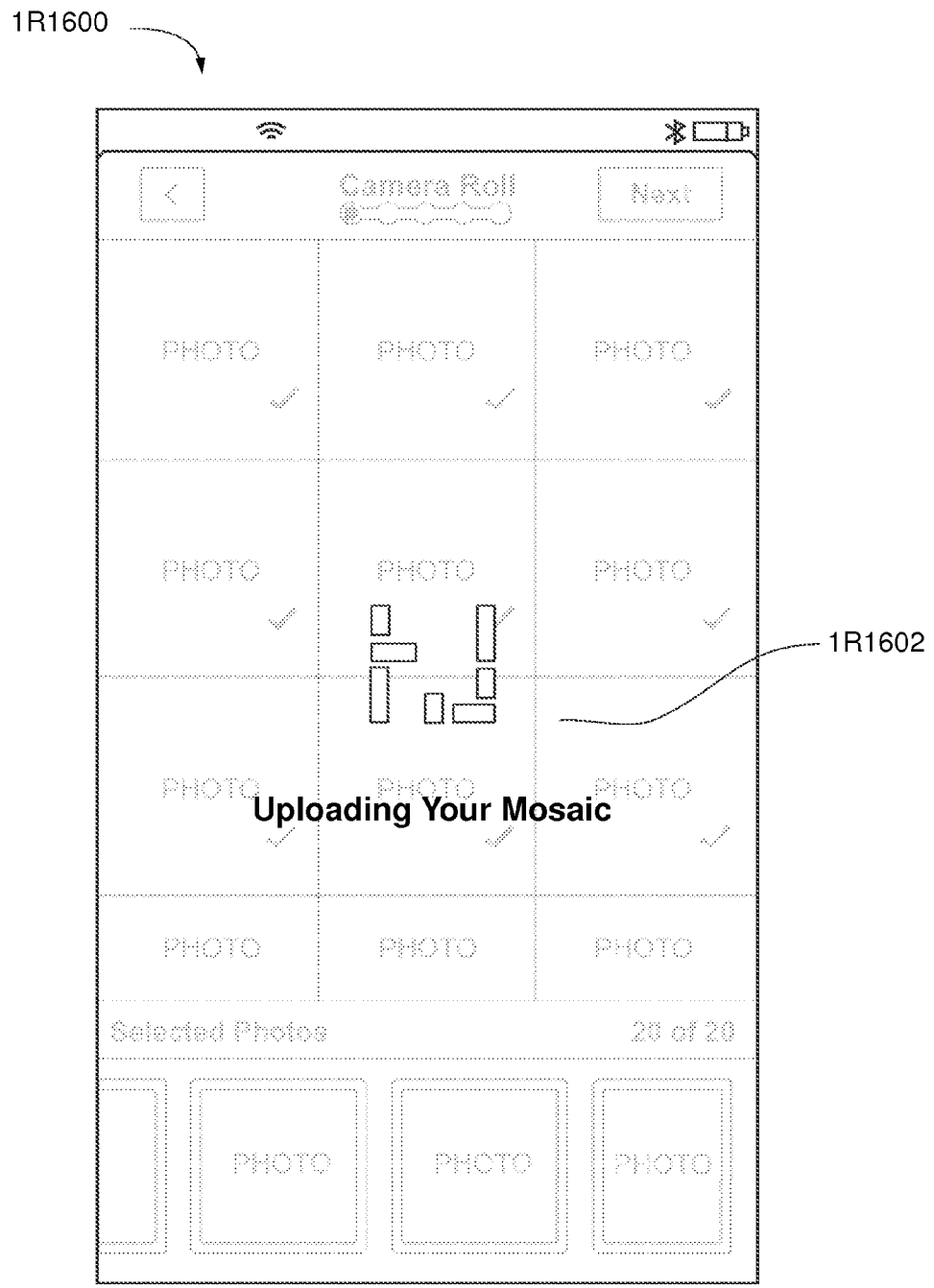
FIG. 1R is a diagram showing a method of uploading media files at a mobile device, according to one embodiment of the invention.

FIG. 1R is a screenshot embodiment 1R1600 showing an uploading process of images at a mobile device. Once images are selected for an upload, as shown by the method in the embodiment 1Q1500, the mobile device uploads the images to a server. While the images are uploading to the server, the mobile device displays the message 1R1602 in a form of graph or text showing that image uploading is in progress.

Figure 1S:
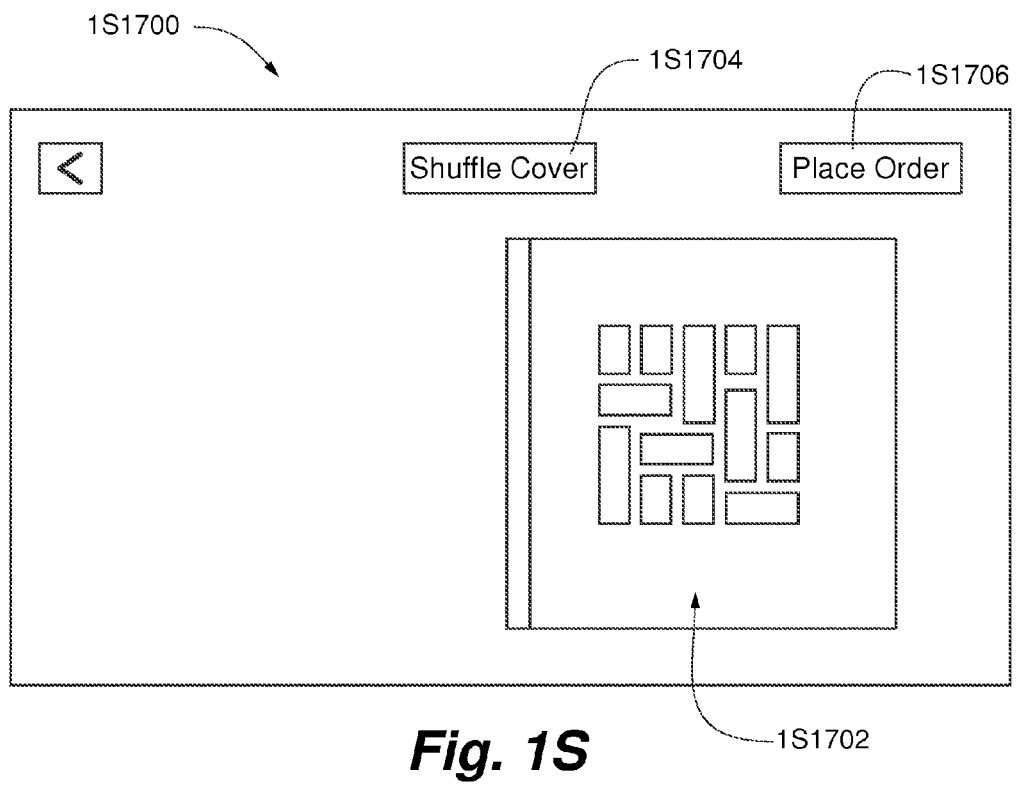
FIG. 1S is a diagram showing a completed project at a mobile device, according to one embodiment of the invention.

FIG. 1S is a screenshot embodiment 1S1700 showing a completed project at a mobile device. After images are uploaded to the server, as shown by the embodiment 1R1600, the server populates a design of a photobook 1S1702. The user can shuffle images in the design by using a shuffle button 1S1704. Further, the server populates a design of every page of the photobook 1S1702. The user can customize every page of the photobook 1S1702 by using image editing tools provided by the present invention. Image editing tools are provided by the user-device or the server. Image editing is also performed by the server as a part of image analysis. After the customization is complete, the user can proceed to order the photobook by pressing a button place order 1S1706.

Figure 1T:
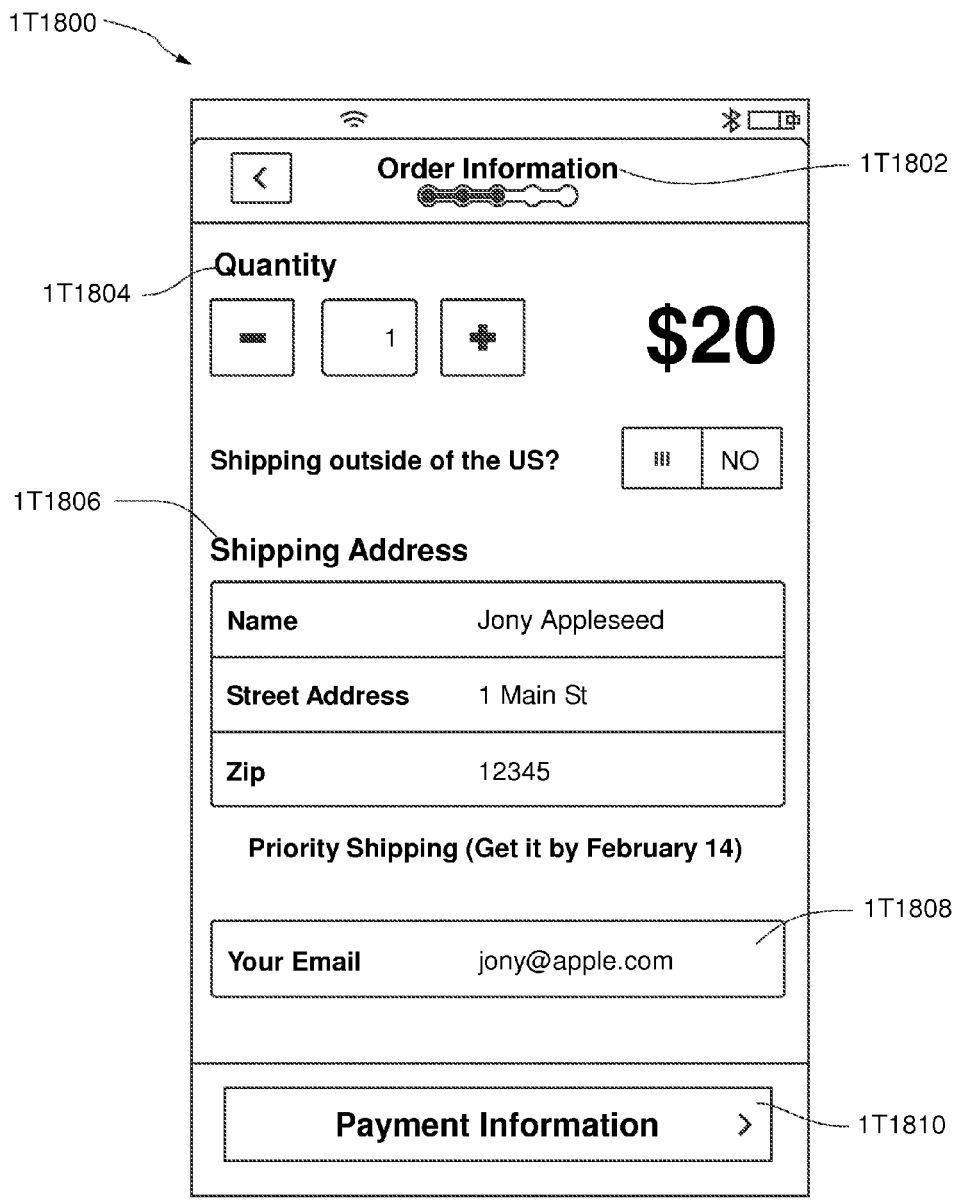
FIG. 1T is a diagram showing a method of ordering a media-based project at a mobile device, according to one embodiment of the invention.

FIG. 1T is a screenshot embodiment 1T1800 showing a method of ordering a project (photobook or book) at a mobile device. Once a user completes a customization of a photobook, an order information 1T1802 is displayed at the mobile device. The user can specify a quantity of the order at the quantity area 1T804. A price information is also included with the quantity information. The user can enter a shipping address in the area 1T1806, and an email address in the area 1T1808. The user continues a processing of payment for the order by pressing a button payment information 1T1810. The button payment information 1T1810 directs the user to a payment processing gateway to complete the order.

Figure 1U:
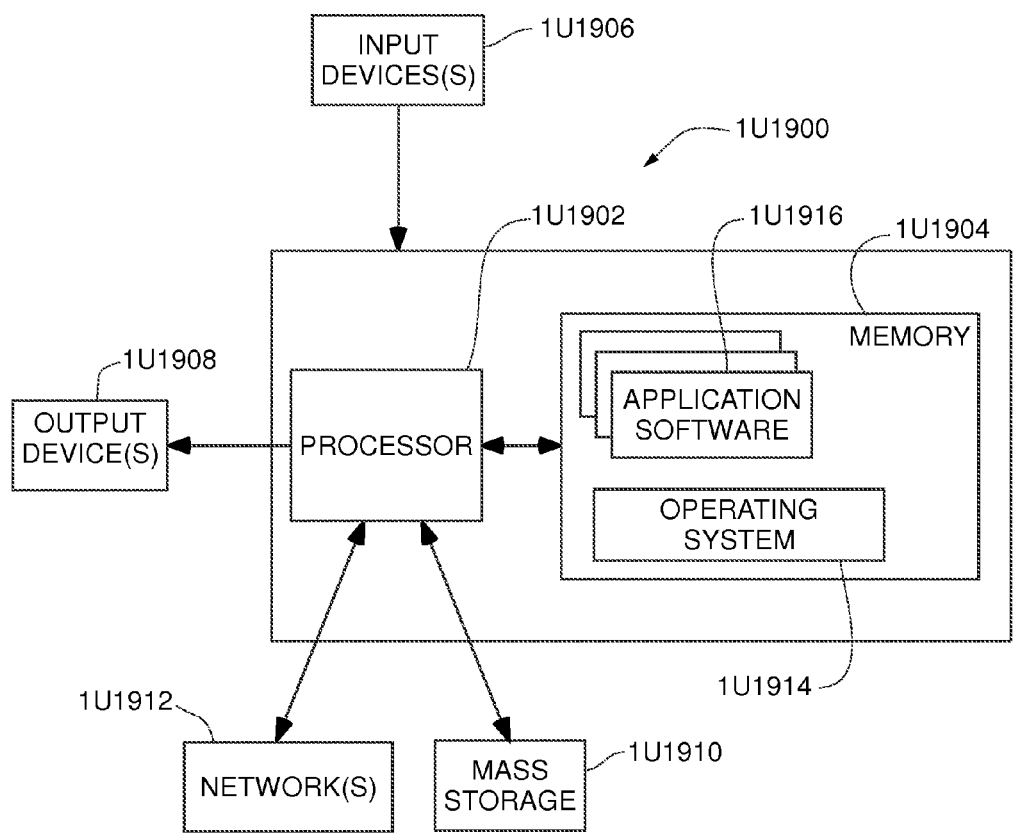
FIG. 1U is a schematic diagram of a user-device, within which the invention may be embodied, according to one embodiment of the invention.

FIG. 1U is an embodiment of a user-device wherein the invention may be practiced. A user-device comprises a processor 1U1902, an operating system 1U1914, an application software 1U1916, a memory 1U1904, at least one input device 1U1906, at least one output device 1U1908, a mass storage device 1U1910, and a network 1U1912. The network 1U1912 comprises a wired or wireless network to communicate to remote servers and databases via the Internet.

Figure 1V:
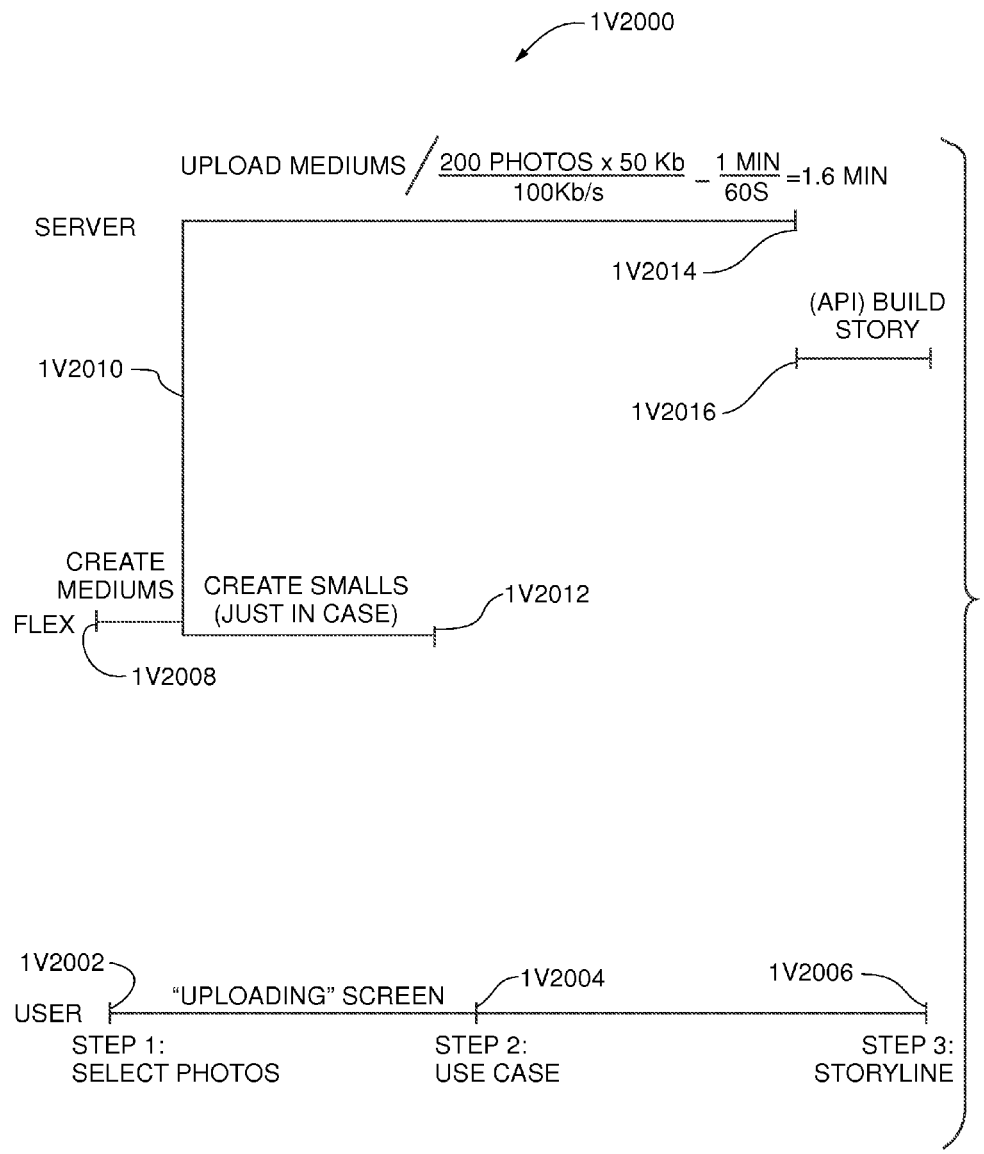
FIG. 1V is a timing diagram showing a timeline of image uploading, according to one embodiment of the invention.

FIG. 1V is a timing diagram 1V2000 showing a method of background uploading of media files. Steps in the embodiment 1V2000 are shown using timelines or progress bars. A user at step 1V2002 selects original photos or images for an upload. Once photos are selected, an uploading screen appears acknowledging the user that the upload is in progress. At step 1V2004, a use case is created to build a project. The use case is created by a server after performing a server-side image analysis. At step 1V2006, the user can further customize the project by adding a storyline or narrative of the project. A person of ordinary skill in the art of image uploading and editing can implement FLEX™ technology at step 1V2008. FLEX™ comprises photo resizing libraries. In one embodiment, once original photos are selected, FLEX™ creates medium sized photos by resizing the original photos. However, FLEX™ may also create small sized photos from the original photos. Both the medium sized photos and the small sized photos are uploaded to the server at the step 1V2010. An upload of small sized photos completes at step 1V2012. An upload of the medium sized photos completes at step 1V2014. The small sized photos are uploaded faster than the medium sized photos. Once the upload of medium sized photos completes, at step 1V2016 the FLEX™ API builds a story or use case. Once a use case or story (by grouping of similar photos) are built, the user can add a storyline or narrative to the project. FLEX™ and the FLEX™ API are an exemplary technology that maybe used to implement the embodiment 1V2000 of the present invention. The methods of the present invention are not restrictive to FLEX™ and the FLEX™ API.

A use case may be built by feature or object identification of images, geo-location data, and meta-data. For example, when a plurality of images are selected by a user for building a book, images are grouped together by similarity of objects or features. For example, wedding pictures may be grouped together from a plurality of random pictures by identifying the features of wedding, such as a wedding cake or an altar. Facial recognition is another example of feature or object identification that allows a formation of a use case or grouping of pictures together by facial similarity. A use case of a book can allow the program to better prepare a template for the book, for example, a wedding book.

Improved Uploading Embodiments Illustrated by Examples

Embodiments below are illustrative to further explain the invention with specific examples. Some restrictions may be added in the embodiments below for clarification, while those restrictions may not be applicable to other embodiments explained in other parts of the specification. Embodiments of the present invention are therefore not restrictive to the restrictions in the examples. In a more illustrative sense, the present invention is embodied for:

Photo Selection—

Upon selecting original photos to upload from a user-device to a server, the present invention offers a user an uploading experience where photo uploads happen very quickly by illusion, independent of the actual uploads that are really happening.

Initial Medium-Sized/Thumbnail Photos Uploading—

The user moves to a next step of a creation process of a book where the user chooses a storyline or use case. While the user is moving on with the process, in the background, meta-data (EXIF data) is extracted from the photos, the user-device resizes them to a predetermined photo size ("medium-size" or "thumbnails," for example, 1000px on a side) or ~130 kb, and upload this information to the server. As the photos reach the server, image analysis, smaller image size generation, and photo enhancement will be done on the server inline. However, the client-side resizing at the user-device has to be fast to offer the user an illusion of a faster upload.

Thumbnails & Metadata Used to Build a Book—

Once the metadata information and thumbnails are uploaded, and an image analysis run on the server side, the user-device can now proceed to call the server to have a book created using the information extracted from the photos, and the storyline and use case the user selected along with the data from the storyline.

Original Image File Uploading in the Background Computer Process—

After the aforementioned process of Initial Medium-Sized/Thumbnail Photos Uploading is completed, the original photo files are uploaded to the server in the background computer process while the user modifies the book.

Additional Embodiments of Upload Optimization

Several illustrative examples of upload optimization are now discussed. These illustrative examples may be used alone or in combination to further improve the image uploading experience of the user.

Illustrative Photo Set Reduction Optimization

If the median time to build a book is measured in minutes, the user might be finished with creating a book before the original photos are finished uploading in the background computer process. Say, for example, that a user has 100 photos, each of size 2.5 megabytes (MB) to upload. To upload 250 MB of photos at an average upload speed of 1.4 Mbps or 175 kb/s, it will take ~40 minutes. If the present invention reduces the photo set by 60% by removing photos, then a total uploading time will be 16 minutes (in the background computer process). To achieve a reduction in time, there are three heuristics that may be implemented:

Filter Out Undesirable Photos in a Creation Flow of the Book by the User—

A first heuristic in this process is to identify poor images in the photo set that the user does not want to use after the initial thumbnail [resized images or medium size images] uploading and have the user remove these photos at this step. Although this adds another step into the book creation process, this could pay dividends later on when the user finishes the project and have to wait less overall time for the photos to upload. Better yet, the photos will be more likely to have all the originals uploaded by the time the user is done with creating the book.

Filter Out Undesirable Photos at the Very End—

There may be two problems with the first heuristic. One, it adds another step (friction point) in the process. Two, it does not take out photos not used in the book because at that point the user is not sure which photos will make it into the book. When the user is done with the customization or creation of the book, and is ready to order and if there are still original photos to upload, upon leaving the book creation process, the user will be asked to choose between three options:

Finish Uploading Photos Used in the Book

Finish Uploading All Photos Selected by the User

Pick Which Photos to Upload: This option will present the user with an ability to select (among the photos used in the book) other photos to upload so the photos could potentially be used on future projects.

Filter Out Undesirable Photos Automatically—

An alternative to both options above is to identify poor images in the photo set automatically by performing image analysis on the client-side, to predict probabilistically those images that the user is unlikely to use during the actual creation of the finished product, and to automatically detect such photos and remove them. This has the potential disadvantage in that computationally intensive image processing is required to be performed on the client-side, which might be a browser with limited memory.

Illustrative Checkout Optimization

Currently, on prior art products, if a book is completed before original photos are uploaded, a user is stalled from leaving the editor (workspace of the project) to purchase the book. Instead of pausing the user at this step, the present invention offers an option to pause the user after the user orders the book.

Illustrative Desktop Background Uploader Optimization

If a user finishes the project and is ready to order a book, the invention provides the user an option to download an uploading widget which will link the photos the user selected for the book with the ones on the file system of a user-device. Once an upload continues, the user can continue to the shopping cart or interacting with the rest of the website (embodiments) of the present invention.

Illustrative Editor Preloading Optimization

Since photo preloading is the first step of the process in creating a book, an embodiment of the invention can create a lightweight SWF of ~500 kb to deal with the photo uploading. While a user selects original photos, the present invention loads FLEX™ framework in the rest of the photobook creation interface.

HTML5 compatible browsers that support drag and drop features maybe implemented with the present invention to offer a user an ability to drag and drop an image file folder from a user-device for an upload. Furthermore, image analysis and image adjustments are performed on uploading servers.

Detailed System Architecture

Figure 1W:
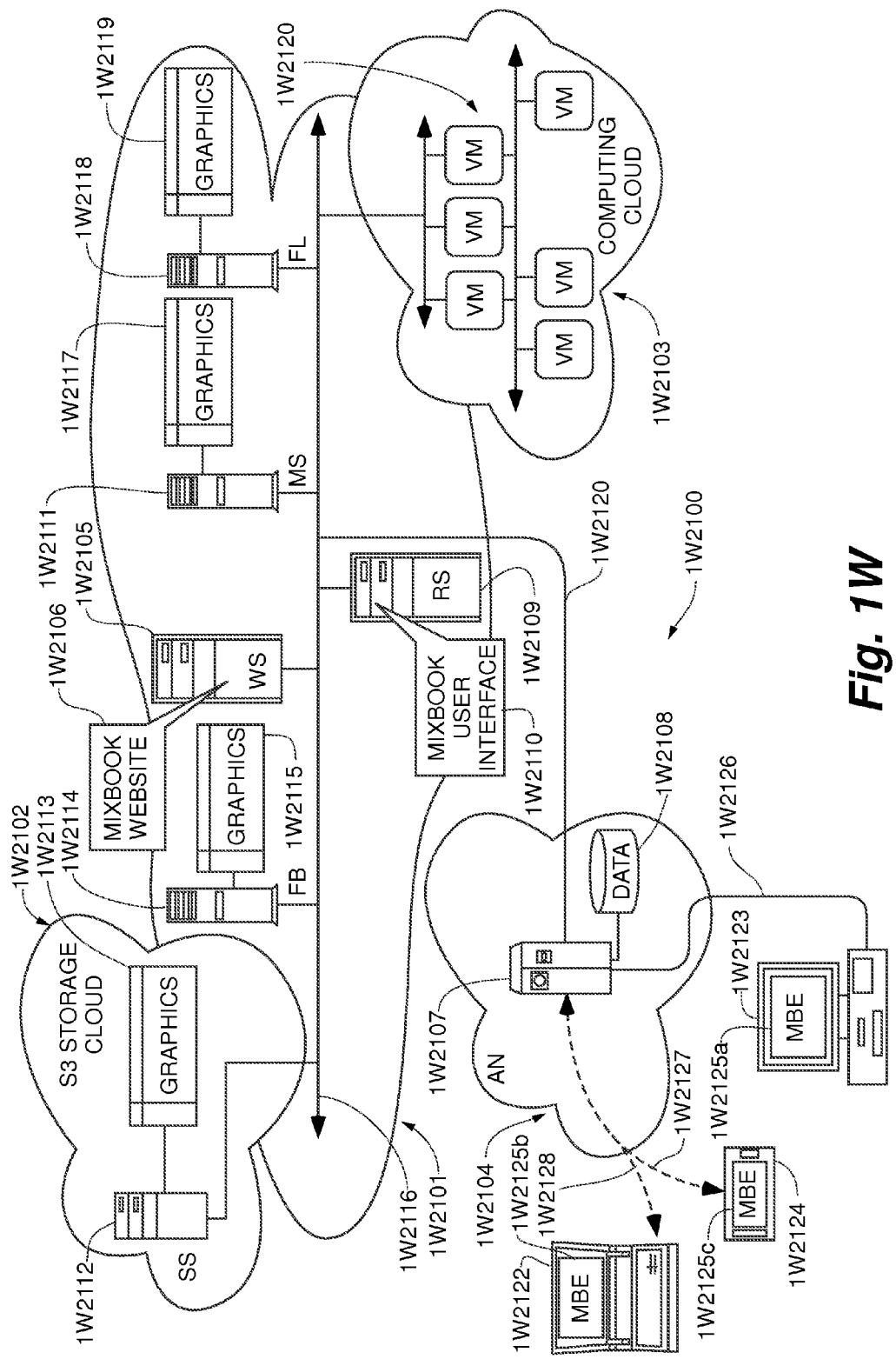
FIG. 1W is an architectural overview of a communications network supporting network-based graphics manipulation and production of media-based products, according to other embodiments of the present invention (these embodiments sometimes known as "MIXBOOK").

FIG. 1W2100 is an architectural overview of a communications network 1W2100 supporting network-based graphics manipulation, and production of media-based products according to embodiments of the present invention (these embodiments sometimes known as "MIXBOOK"). Communications network 1W2100 includes a wide-area-network (WAN). WAN 1W2101 may be a private, corporate, or publicly-accessible data network. WAN 1W2101 may be referred to as the Internet 1W2101. The Internet 1W2101 is further illustrated by way of a network backbone 1W2116, which represents all of the lines, equipment, and access points that make up the World Wide Web (WWW) as a whole including any connected sub-networks. Therefore, there are no geographic limits to practice of the present invention.

The Internet backbone 1W2116 supports a web server (WS) 1W2105. It is noted herein that all network-capable computing appliances such as physical computers, servers, and other computing machines discussed in this specification shall be assumed to contain, be coupled to, or otherwise have accessible thereto, one or more digital mediums adapted to contain the data and software required to support and enable the primary function or functions (in the case of multi-task machines) of the computing appliance.

WS 1W2105 is an electronic information server connected to the Internet 1W2101 and adapted to server information pages or web pages as they are known in the art. WS 1W2105 may be maintained by a third party that provides a website hosting service. In one embodiment a service provider providing the service of the present invention owns and maintains WS 1W2105. WS 1W2105 hosts a website 1W2106, through which, users may access elements of the present invention. Website 1W2106 is adapted to provide authenticated access to users who create, publish, print, and purchase media-based products such as photo-books, photo-cards, photo-calendars, photo-posters, video-books, video-calendars, video-cards, and related products.

Communications network 1W2100 also includes an access network (AN) 1W2104, which may represent any data network adapted to provide access to the Internet network 1W2101. AN 1W2104 may be a public-switched-telephone-network (PSTN) or some other public or private telephony network. AN 1W2104 may be a local wireless network, a cellular time division multiple access (CDMA) network, a wireless fidelity (WiFi) network, or any other candidate access network through which one may access the Internet 1W2101.

A user may access WS 1W2105, more particularly MIXBOOK™ website 1W2106, through the Internet access facility 1W2107 in access network (AN) 1W2104 and an Internet access line 1W2120. The Internet access facility 1W2107 may be maintained and operated by an Internet service provider (ISP) or by a wireless Internet service provider (WISP), whichever is appropriate for any particular Internet connection. Users who might access WS 1W2105 are represented herein as network-capable computing appliances, more particularly, a laptop computer 1W2122, a desktop computer 1W2123, and a smart telephone 1W2124. Each mentioned appliance may be assumed to be Internet-capable by way of one or more network browsing applications residing thereon and executable there from.

Desktop computer 1W2123 is connected to an Internet-connection server 1W2107 by way of an Internet access line 1W2126. Desktop computer 1W2123, once connected, may access website 1W2106 hosted on WS 1W2105. Desktop computer 1W2123 has one or more input devices (not illustrated) coupled thereto such as a keyboard, a mouse, and a microphone for (Speech-to-Text Commands). Smart phone 1W2124 may connect wirelessly via a wireless link 1W2127 to an Internet service provider (also represented by machine 1W2107) that establishes a wireless Internet connection like public WiFi for example. Smart phone 1W2124 may or may not include a keyboard input device. In one embodiment smartphone 1W2124 has a touch-screen display. Laptop 1W2122 is illustrated as connected wirelessly to the Internet 1W2101 via WISP 1W2107 using wireless link 1W2128. Laptop 1W2122 includes a keyboard and/or other input devices as may be appropriate.

Laptop 1W2122, desktop 1W2123, and smartphone 1W2124 each include an Internet browser application (not illustrated) for accessing and navigating network 1W2101. Backbone 1W2116 supports a runtime server (RS) 1W2109 adapted to host a MIXBOOK™ user-interface 1W2110. User interface 1W2110 is accessible to all website visitors for the purpose of creating, manipulating, and printing media-based products such as a photo collage book, for example. Users accessing website 1W2106 who are ready to create a product may be re-directed to RS 1W2109.

Each user authorized to create and publish a media-based product using the site may receive a small download containing a compact editing package known as the MIXBOOK™ editor ("MBE") in some embodiments. MBE 1W2125a is installed as a browser-based extension or plug-in in one embodiment on desktop computer 1W2123. Laptop 1W2122 has an instance of MBE 1W2125b installed as a browser-based extension or plug-in. Smartphone 1W2124 has an instance of MBE 1W2125c installed as a browser-based extension or plug-in. An instance of MBE may be customized for any computing appliance that may access the Internet and through which a user may see and edit content. Therefore, MBE instances 1W2125 (a-c), though the same basic extension or plug-in, may contain differences based on host requirements. In one embodiment of the present invention there are no software downloads required in order to practice the present invention. In this case the MIXBOOK™ editing SW may be server hosted only. In another embodiment, the MIXBOOK™ editing SW may be ported to a desktop application such as Adobe Air™ and thus be operated as a desktop application. In one embodiment the SW is included as an add-on feature to any suitable desktop application and may be installed on a computing host with that desktop application from a removable medium such as a CD ROM, for example.

Service provider facility 1W2107 includes a connected data repository 1W2108. Data repository 1W2108 contains all of the customer contact and billing information for the Internet service provider. One with skill in the art will appreciate many possible internet connection schemes. It is preferred in most embodiments that users have a high speed Internet connection for the purpose of manipulating and editing graphics, which can be bandwidth intensive. The inventors provide one or more innovative solutions for saving bandwidth while editing images and image products online making the entire experience more efficient and easier for users practicing the invention.

The MIXBOOK™ website 1W2106 establishes a community-based portal and social interaction site that revolves around creating, editing, sharing publishing, printing, and purchasing media-based products created online by one or more user working in collaboration together. Users such as those operating appliances 1W2122-1W2124 connect online and navigate to WS 1W2105 to access website 1W2106. When any user determines to create a media-based product like a photo album, for example, the user is directed to an appropriate portal server like RS 1W2109 hosting MIXBOOK™ user interface (UI) 1W2110. UI 1W2110 is adapted to provide all of the assets needed to create and publish complete image and/or text-based products. Media-based products created through website 1W2106 include products containing images uploaded by one or more authorized users. Any work in progress or completed is termed a project. A project may be initiated by one user whereby other users are then invited by the initiating to join the creative experience in collaboration, and those users may contribute their own photos to the project. Such a project may be published for viewing by all or some of the community. Finished projects may be printed and distributed as "hard products" available for purchase by members of the community.

In one embodiment, a persistent storage of graphics uploaded by community members to be included into projects is obtained (leased) through a third-party storage provider. In this example, a simple storage service (S3™) data storage cloud 1W2102 is illustrated and made available for use by a third-party service provider such as AMAZON™. A storage server 1W2112 is illustrated within S3 cloud 1W2102 and has connection to the Internet backbone 1W2116. SS 1W2112 may be one of many servers including associated mass data repositories connected to SS 1W2112 such as repository 1W2113 contained within storage cloud 1W2102. In this logical representation all of the graphics (images or photos) that are uploaded to insert into projects are stored in a repository such as repository 1W2113 in storage cloud 1W2102. Repository 1W2113 may be an optical, magnetic, or some other type of data storage facility. In one embodiment, mass computations required for real-time and transparent editing and collaborating on multiple projects are performed by virtual machine instances 1W2120 in a computing cloud 1W2103. In another embodiment, the service host may maintain one or more powerful computing machines and storage devices for performing computations and for storing graphics for users of the service.

In use of the present invention a user operating one of computing appliances 1W2122-1W2124 connects online and accesses MIXBOOK™ website 1W2106 and logs into the site. If the user has already registered and created a project, a web page personalized to that user is served that includes all of that user's projects in the latest states of progress. The user may enter any project for which she or he has authorization to contribute to, and may review, edit, or otherwise work the project. Photos uploaded by the user to include into projects may be stored in cloud 1W2102 and served to the projects when needed by the system. Any computing such as editing, resizing, alterations, and so on may be handled in cloud 1W2103. A user may, through website 1W2106, authorize other users registered with the service of the invention to collaborate on a project initiated by that user. In one embodiment, a user having a project initiated may invite other potential users to the site so they may, with permissions, enter the site and collaborate with that user.

In one embodiment of the present invention, photos that are stored on the Internet can be represented in any online project provided the user has authorized access to those photos. For example, a user who has one or more accounts to third-party social interaction networks like FACEBOOK™, MYSPACE™, PHOTOBUCKET™, FLICKR™, or similar sites may use photos of registered friends that they are allowed to access in their own personal projects. These photos do not have to be uploaded to the service of the present invention. Rather, these photos can be accessed from their present storage locations anywhere on the Internet provided that the storage system is online.

The Internet backbone 1W2116 supports a FACEBOOK™ server (FB) 1W2114 coupled to a data repository 1W2115 for storing images and other graphics. The Internet backbone 1W2116 supports a MYSPACE™ server (MS) 1W2111 coupled to a data repository 1W2117 adapted to store images and other graphics. Backbone 1W2116 supports a FLICKR™ server (FL) 1W2118 coupled to a data repository 1W2119 adapted to store images and other graphics. Any of these images can be served to an active project by the respective servers directly from their storage locations. Any of these images that are altered during project work or collaboration may be subsequently saved to third-party S3 storage cloud 1W2102 in repository 1W2113 controlled by SS 1W2112.

In one embodiment of the present invention, MIXBOOK™ website 1W2106 includes or has working access to a SW print engine (not illustrated here) that is adapted to render any MIXBOOK™ project for professional printing. In one embodiment, printing is performed by a third-party provider who may also ship and/or distribute finished products for a price. In one embodiment, a user may access the service through Website 1W2106 and may initiate and complete a project that will be printed for that user for a static price for that particular product.

It is noted herein that a project created on MIXBOOK™ may be efficiently gathered for print in virtually any print format. Likewise, content originally laid out in one format or aspect ratio may be efficiently converted to another layout before printing in an automated process that incorporates the typical size and layout changes necessary to convert from one layout to another automatically. Furthermore, content assembled for a particular layout and product type may be automatically converted for print output in another layout and product type.

Auto-Creation of Media-Based Products Based on Image Analysis

Embodiments of the present invention allow for auto-creation and auto-editing of media-based projects, as described and disclosed below. First, a detailed overview of the inventive concept is described. Next, one general embodiment of the present invention is discussed. Next, an illustrative image analysis algorithm according to one embodiment of the present invention is described. Next, an illustrative and specific example of the invention is disclosed. Finally, conclusions and discussion related to how the invention can be utilized in practice and the benefits it provides is discussed.

In some embodiments, this invention allows for auto-creation and auto-editing of media-based projects, as described and disclosed below. In the case of creating a book with user's photos, a complete printable book can be achieved without inspecting the features of the photoset contained within that book or knowing the use-case of a book. One can simply group the photos into spreads and lay them out in the book. With a canvas editor of some sort, the user can make a few tweaks and buy the book. However, this has several drawbacks, in that there are many friction points in which the user might get frustrated with the customization process, and quit the application before the order is placed.

According to one embodiment of the present invention, knowing the use-case of a book can allow the system to better prepare a template for the book (for example, a wedding book). Furthermore, layering this functionality with photo feature detection and analysis can create a better end-result for the user automatically. One of the drawbacks in the prior art is that photo feature extraction is often incorrect, and the information derived from many algorithms lacks accuracy. For example, in detecting red eyes, the program may think that red nails are actually red eyes.

Prior art products do not know what to do with the information once photo features are extracted. For example, if a user is creating a book about a wedding, the user by visual inspection recognizes the bride and the groom in the photos. Prior art products are incompetent in deciding on what to do with the extracted information, where to put photos on which page in the book, and how to emphasis photos of family and friends.

In the present invention, photo or image analysis and use case are paired successfully. A user will observe that the books that are auto-created are closer to what the user desires, thereby reducing barriers to purchase photobooks online. In prior art products, prior art books are created based on a theme, which is a stylistic parameter that gives prior art books a certain look. However, prior art books may not have any bearing on the layouts used and on how photos are grouped together.

For example, when face recognition capability is used to detect that the bride and the groom are in a set of wedding photos, the present invention can layer a ranking algorithm to determine the best shots of each, the bride and the groom, individually, and combine the bride and the groom both onto the cover page of the book. In prior art products, any two random photos would be selected for the cover page and it is up to the user to switch.

In another example, if a user specifies that the user is making a book about a recent vacation, the present invention looks at the meta-data of the uploaded photos to detect their geo-location, and cross-match the location with a database of famous locations. For example, if the user has a picture showing the Eiffel Tower, the present invention can add a descriptive caption to the page and place the photo of the Eiffel Tower there.

Another benefit of the present invention is that by knowing the use case of a photo book being created, the present invention can fine-tune computer vision algorithms to pick out common items in the photo set. For example, if a customer is making a book about camping, the present invention can use object detection algorithms to look for camping equipment such as tents or trailers. If such photos are found in the photo set, the process can decide to have the algorithm put these photos on the cover. If the process didn't know that the user was making a book about camping, the process could still look for things such as tents and trailers, but then the process would also end up looking for other items from different use cases such as beaches for a tropical vacation or a shot of the alter in the case of a wedding. Generic object detection is not a solved problem and without additional information to target the searches (such as the usecase in the present invention), the inventors have found that the rate of false positives will be very high and unusable. For example, if the process was attempting to detect red eye in a photo, knowing nothing else, the process might end up detecting two red-nail-polished fingers in a "peace-sign" as red eyes. However, if the process had additional information, such as the outlines of the face, the red-eye detection would be more accurate. The same holds for extracting features from photos, such as landscapes, objects, whether it's nighttime/daytime, people, etc., by knowing the use case and optimizing the vision detection algorithms based on the use-case provided.

As a result, the book that the software builds is much more relevant and closer to being in a state in which the user would purchase the product. Many competitors offer photo book editors, but once a book is presented to the user, the user has to spent hours customizing layouts, colors, themes, captions to get it to a point that they are happy with it. Users dropping off a photo book service is a key reason why purchases are not made. This technology reduces the hurdles that a customer has to jump over and brings them closer to purchase. For example, in a wedding book, understanding where and what objects are in the photos, photos can be automatically cropped and positioned in a way the accentuates the book. A wedding cake can be specifically looked for since the process according to the present invention knows the context of the book being created. Once the wedding cake is found, the process can put all those photos with it onto one aesthetically-pleasing page.

Image Analysis Embodiment—General Case

The disclosed embodiments improve upon the problems with the prior art by providing a system that allows for quick and easy creation of media-based projects over a communications network. The disclosed embodiments leverage the reduced costs of processing units in most servers and computers to provide various functions over a communications network to automate, either fully or partially, the process of creating a media-based project over the Internet. The disclosed embodiments automate the processes normally undertaken by users creating photo-based projects online, such as sorting through photos, removing the photos that are not adequate or properly focused, choosing the correct photos, grouping photos together by topic or location, ordering the photos by chronological order, and cropping or focusing photos on the relevant portions of the photos. Thus the disclosed embodiments reduce the amount of time required by users to create a photo-based project. Further, the disclosed embodiments automate the corrections or modifications normally performed by users creating photo-based projects, such as correctly orienting photos, re-coloring photos or performing a color correction on the photos, removing red-eye from the eyes of photo subjects, and correcting the photos for brightness or contrast. This eliminates the requirement that the user must open a special program or app to perform the correction or modification, thereby removing the time-consuming and frustrating nature of these steps when performed manually. The disclosed embodiments are further beneficial because, due to their time-saving nature, they reduce the number of users that drop off or discontinue the photo-book creation process before completing a purchase.

Figure 2A:
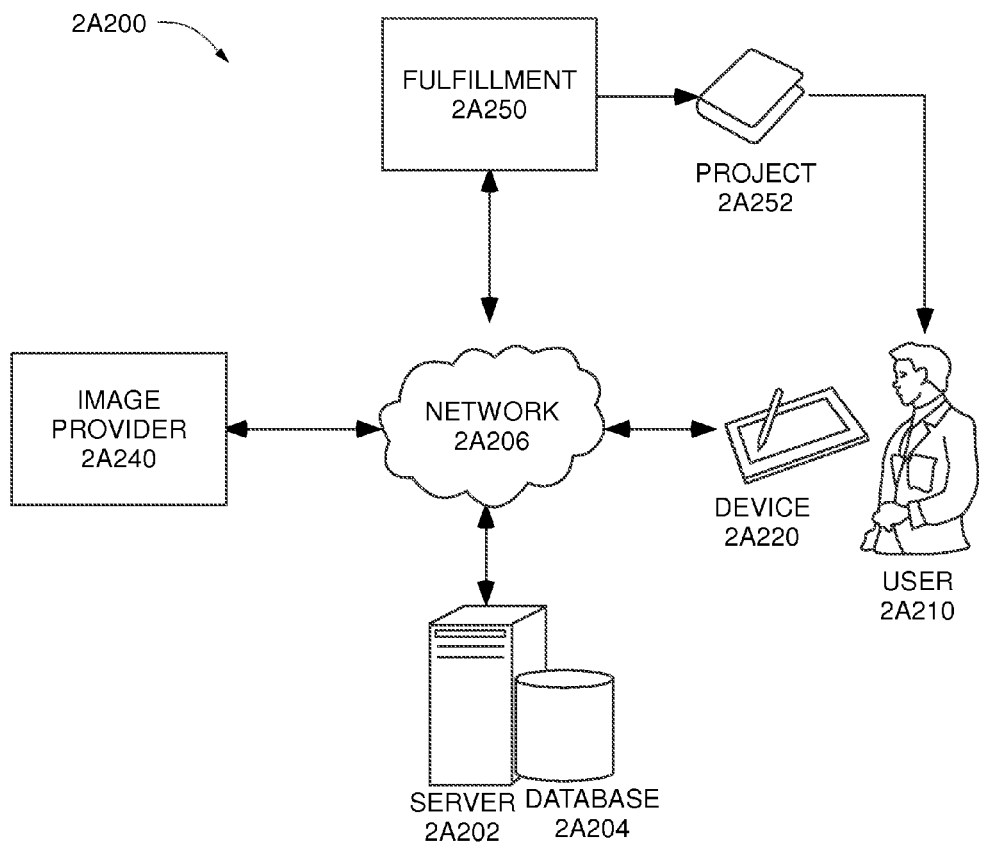
FIG. 2A is a block diagram illustrating the network architecture of a system for facilitating the creation of photo-based projects over a communications network, in accordance with one embodiment.

FIG. 2A shows an illustration of a block diagram showing a network architecture of a system 2A200 and method for facilitating the creation of photo-based projects over a communications network in accordance with one embodiment. FIG. 2A shows various components coupled with network 2A206, which can be a circuit switched network, such as the Public Service Telephone Network (PSTN), or a packet switched network, such as the Internet or the World Wide Web, the global telephone network, a cellular network, a mobile communications network, or any combination of the above. A prominent element of FIG. 2A is the server 2A202 associated with a data repository or server-side database 2A204 and further coupled with network 2A206. Server 2A202 collects, processes and manages data from the users 2A210 and further manages the server-side database 2A204, which holds the master copy of data that is served to fulfillment entity 2A250 and client device 2A220. FIG. 2A further includes user 2A210 and his or her client computing device 2A220, which may be a desktop computer, a common computer terminal, or mobile computing devices such as smart phones, mobile phones, tablet computers, handheld computers, laptops, or the like.

FIG. 2A shows an embodiment of the present invention wherein networked client computing device 2A220 interacts with server 2A202 and server-side database 2A204 over the network 2A206. Server 2A202 may comprise one or more servers, workstations, desktop computers, computer terminals, workstations, mainframes, mobile computing devices, smart phones, mobile phones, handheld computers, laptops, or the like. Server 2A202 and client computing device 2A220 include program logic comprising computer source code, scripting language code, or interpreted language code that may be compiled to produce an executable file or computer instructions, or that may be interpreted at run-time, wherein the computer source code performs various functions of the present invention. Server 2A202 may include a software engine that executes applications as well as delivers applications, data, program code, and other information to networked computing devices, such as device 2A220. FIG. 2A further shows a database or repository 2A204, which may be a relational database comprising a Structured Query Language (SQL) database stored in a SQL server. The repository 2A204 serves data from a database, which is a repository for data used by server 2A202 and device 2A220 during the course of operation of the invention. Database 2A204 may be distributed over one or more nodes or locations that are connected via network 2A206. The database 2A204 may include user account records, user records, and multimedia records that include images, video, audio and like.

It should be noted that although FIG. 2A shows only one server 2A202, one database 2A204, one client device 2A220, and customer 2A210, the system of the present invention supports any number of servers, databases, client devices, and customers connected via network 2A206. Also note that server 2A202 is shown as a single and independent entity; in one embodiment, the functions of server 2A202 may be integrated with another entity, such as one image provider 2A240, fulfillment entity 2A250, device 2A220, and/or the database 2A204. Further, server 2A202 and its functionality, according to a preferred embodiment, can be realized in a centralized fashion in one computer system or in a distributed fashion wherein different elements are spread across several interconnected computer systems.

FIG. 2A further shows fulfillment party 2A250, which performs product fulfillment or order fulfillment services, i.e., the process of fulfilling the obligation of server 2A202 (or the entity represented by server 2A202) to send user 2A210 one or more photo-based project products 2A252 that the customer has ordered, purchased, or requested from the server 2A202 (or the entity represented by server 2A202). Fulfillment party 2A250 may receive orders for the photo-based project products, print the photo-based project products, bind the photo-based project products, package the products, and then ship the ordered products 2A252 to the end customer, such as user 2A210. In the course of a transaction, the server 2A202 may interface with fulfillment party 2A250 to effectuate the delivery of purchased products to the customers after payment has been effectuated. Note that although fulfillment party 2A250 is shown as a single and independent entity, in one embodiment of the present invention, the functions of fulfillment party 2A250 may be integrated with another entity, such as server 2A202. Further, the functionality of fulfillment party 2A250 may be realized in a centralized fashion in one computer system or in a distributed fashion wherein different elements are spread across several interconnected computer systems.

Figure 2B:
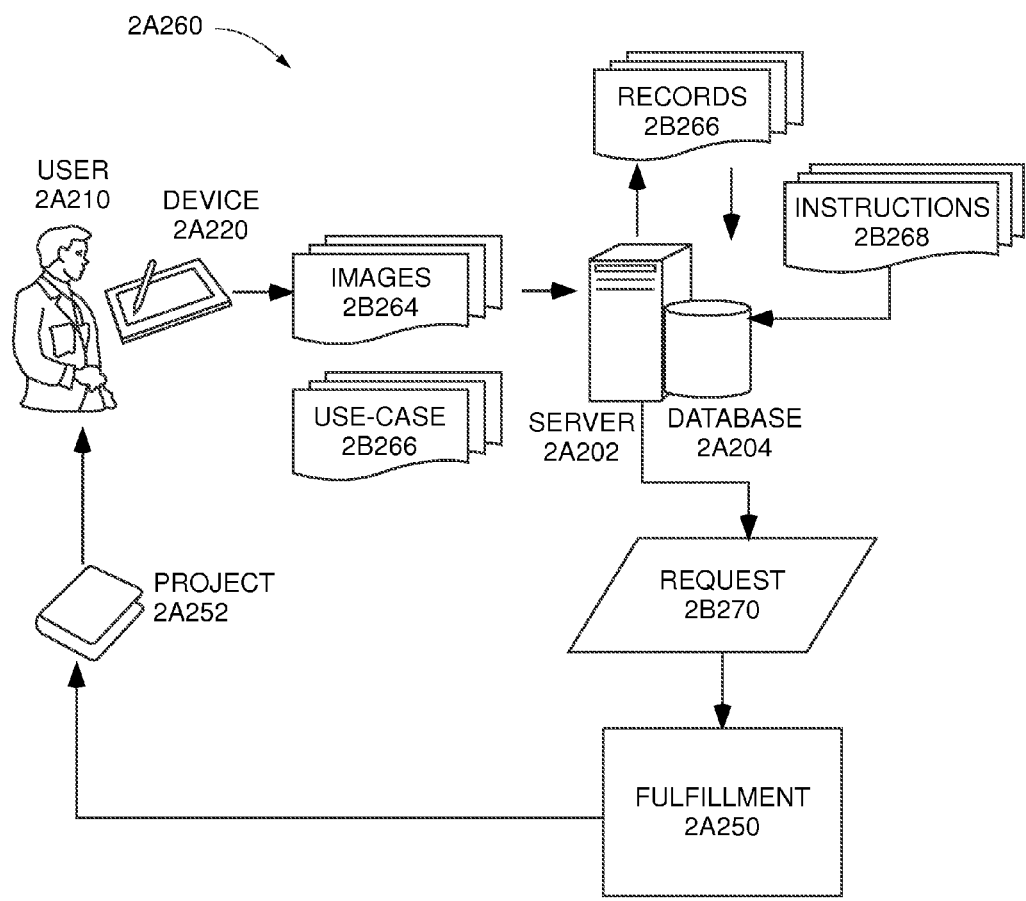
FIG. 2B is a block diagram illustrating the data flow of the system for facilitating the creation of photo-based projects over a communications network, in accordance with one embodiment.
Figure 2C:
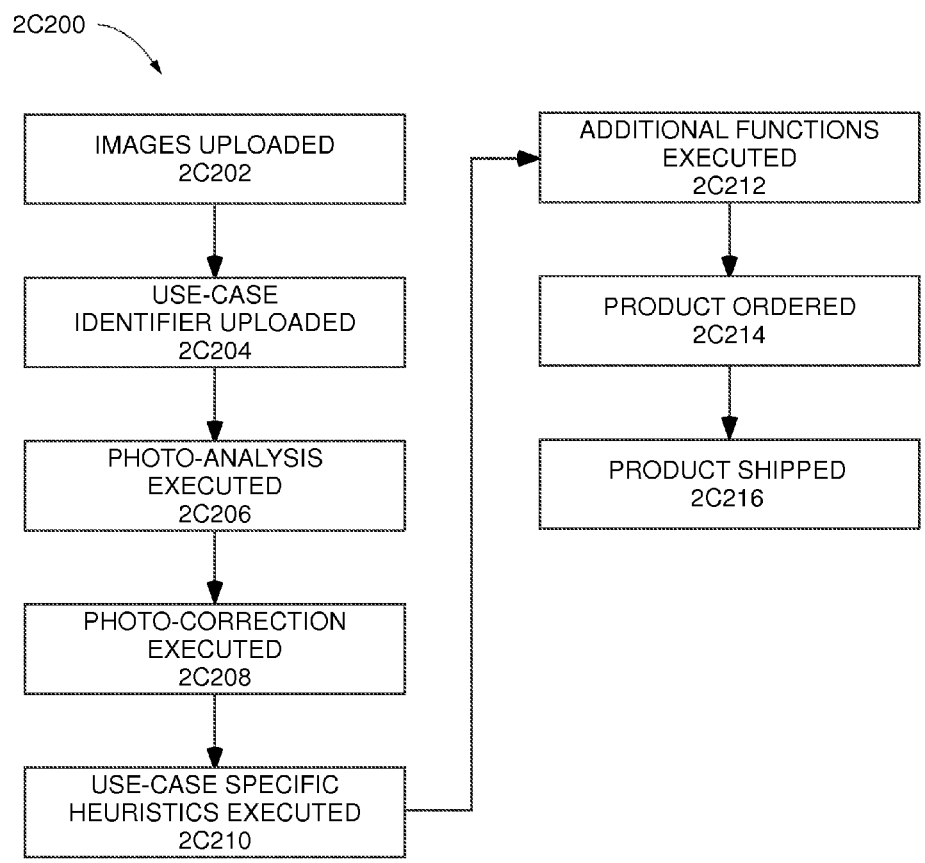
FIG. 2C is a flowchart depicting the general control flow of the process for facilitating access to a large data store over a communications network, according to one embodiment.

The process of facilitating the creation of photo-based projects over a communications network will now be described with reference to FIGS. 2B to 2C below. FIGS. 2B to 2C depict, among other things, the data flow (2A260) and control flow (2C200) in the process for facilitating the creation of photo-based projects over a communications network 2A206, according to one embodiment. The process 2C200 of the disclosed embodiments begins with step 2C202, wherein the user 2A210 provides, via his or her device 2A220 over the network 2A206, at least a plurality of images or photos 2B264 to the server 2A202 for storage in the database 2A204. In one embodiment, the images or photos 2B264 are provided to server 2A202 via a graphical user interface executing on the device 2A220. In another embodiment, the images or photos 2B264 are provided to server 2A202 for storage in the database 2A204 via TCP/IP and/or HTTP over network 2A206. Subsequently, server 2A202 stores the images or photos 2B264 in the database 2A204 as records 2B266. In one embodiment, the records 2B266 are stored in association with an identity for user 2A210 or in association with a user record for user 2A210.

Next, in step 2C204, the user 2A210 provides, via his device 2A220 over the network 2A206, a use-case identifier 2B266 to the server 2A202 for storage in the database 2A204. In one embodiment, the use-case identifier 2B266 is provided to server 2A202 via a graphical user interface executing on the device 2A220. In another embodiment, the use-case identifier 2B266 is provided to server 2A202 for storage in the database 2A204 via TCP/IP and/or HTTP over network 2A206. Subsequently, server 2A202 stores the use-case identifier 2B266 in the database 2A204 in association with records 2B266. In one embodiment, the use-case identifier 2B266 is stored in association with an identity for user 2A210 or in association with a user record for user 2A210.

In the following step 2C206, various photo analysis processes may be executed on the images or photos 2B264 stored in the database 2A204 as records 2B266, at the direction of the user 2A210 via input provided via a graphical user interface executing on the device 2A220. The photo analysis processes comprise identifying similar images, identifying faces in the images, identifying objects in the images, identifying undesirable images, and identifying relevant portions of the images. The identification of faces and objects may be accomplished via object recognition and face recognition libraries. The identification of similar images may be accomplished via an analysis and comparison of color, focus, brightness, faces, objects and the like in each image, as described in greater detail below. The identification of undesirable images may be accomplished by identifying images that are out of focus or contain too little light for a proper exposure. For blurry photos, edge detection may be used to detect any sharp edges, if any. The identification of the relevant portions of an image may be accomplished by identifying the relevant portions of an image, such as faces and objects that may have been recognized. By applying saliency filters, a bounding box may be drawn around a focus of an image. Thus, if the relevant faces or objects are located on the sides of the image, the image may be zoomed or cropped to highlight the identified relevant area. The photo analysis processes may further include identifying images with an incorrect orientation, identifying images with incorrect color, brightness or contract, and/or identifying images with red-eye.

In the following step 2C208, various photo correction processes may be executed on the images or photos 2B264 stored in the database 2A204 as records 2B266, at the direction of the user 2A210 via input provided via a graphical user interface executing on the device 2A220. The photo correction processes comprise: orienting images that have been identified as having an incorrect orientation to an appropriate orientation, adjusting images that have been identified as having an incorrect color, brightness or contract to the correct color, brightness or contract, and removing red-eye from images that have been identified as having red-eye.

In the following step 2C210, various use-case specific heuristics may be executed on the images or photos 2B264 stored in the database 2A204 as records 2B266, based on results of said photo analysis, at the direction of the user 2A210 via input provided via a graphical user interface executing on the device 2A220. The use-case specific heuristics comprise: grouping images that have previously been found to be similar, grouping images having identical or similar faces (based on the faces that were previously identified), grouping images having identical objects (based on the objects that were previously identified), removing undesirable images (based on the images that were previously identified as undesirable), and cropping images to highlight relevant portions of said images (based on the relevant portions of images that were previously identified).

In executing the use-case specific heuristics, heuristics that correspond to the use-case identifier 2B266 are utilized. Different use-cases may require different heuristics. For example, a use-case identifier 2B266 that identifies a wedding would result in heuristics that:

group images having the faces of the bride and groom (based on the faces that were previously identified), group images having the wedding cake or the altar (based on the objects that were previously identified), and crop images to highlight portions of said images having the faces of the bride and groom (based on the relevant portions of images that were previously identified). Instructions 2B268 in database 2A204 may instruct server 2A202 on which heuristics correspond to each potential use-case identifier 2B266 provided by user 2A210.

As an example, with regard to grouping images having the faces of the bride and groom (based on the faces that were previously identified), using face detection, identifiers may be applied to each face to determine, for example, that person A shows up in 85% of the photos, person B shows up in 73% of the photos, and person C shows up in 20% of the photos. Therefore, person A and B are most likely the bride and groom.

In the following step 2C212, various additional functions may be executed on the images or photos 2B264 stored in the database 2A204 as records 2B266, at the direction of the user 2A210 via input provided via a graphical user interface executing on the device 2A220. The additional functions may comprise: reading embedded date or location metadata from the images, performing a lookup of additional location data based on the embedded location metadata, and generating text boxes to be printed below said images upon creation of the photo-based project 2A252. The additional functions may also include ordering the images or photos 2B264 stored in the database 2A204 in chronological order, based on the time the images were taken or created.

In one example of the execution of the process of step 2C212, the server 2A202 reads an image in EXIF format, a standard that specifies the formats for images and ancillary tags used by digital cameras (including smartphones), scanners and other systems handling image files recorded by digital cameras. The EXIF format may store date and time information of the image, camera settings of the image, thumbnails of the image, descriptions of the image, and copyright information for the image. In this example, the server 2A202 may read the location for the image from the file and generate a text box reflecting said location to be printed below said image upon creation of the photo-based project 2A252. In another example, the server 2A202 may read the location for the image from the file (in a GPS coordinate format), perform a lookup to find a corresponding text string that matches the GPS coordinate, and generate a text box having said text string to be printed below said image upon creation of the photo-based project 2A252. In this example, the server 2A202 may read the date and time for the images from their files and place the images or photos 2B264 in chronological order, based on the time the images were taken or created.

In the following step 2C214, the creation process is concluded and the resulting photo-based project product is ordered, at the direction of the user 2A210 via input provided via a graphical user interface executing on the device 2A220. In this step, the server 2A202 sends a request 2B270 to the fulfillment party 2A250 for the photo-based project product 2A252. In the following step 2C216, the fulfillment party 2A250 receives the request 2B270 for the photo-based project product 2A252, prints the photo-based project product, binds the photo-based project product, packages the product, and then ships the ordered product 2A252 to the end customer, such as user 2A210.

Image Analysis Process—Similarity Detection

Figure 2D:
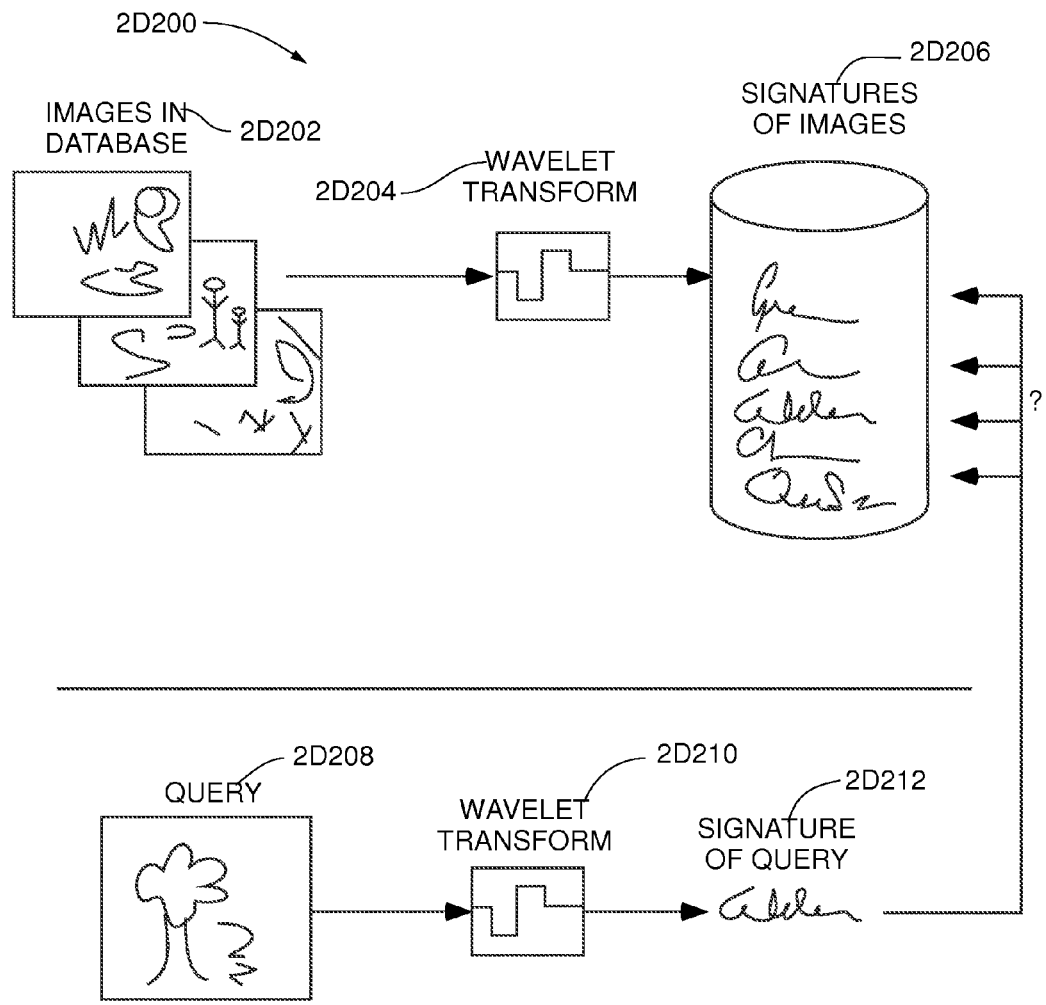
FIG. 2D is an illustrative flowchart of an image analysis process, according to one embodiment of the present invention.

FIG. 2D shows an illustrative image analysis or photo processing process according to one embodiment of the invention. The image analysis process shown in FIG. 2D is illustrative only, and is not intended to be limiting. Various other image analysis processes, some of which are described later, are also within the scope of the present invention. This image analysis process describes an image similarity detection process, as illustrative of the image analysis processes that are useable with the present invention.

In one illustrative image analysis process shown in FIG. 2D, the process 2D200 examines the images for similarity by expressing a query to the image database 2D202 (all of the images) by requesting images that are similar to one of the images (query image 2D208). The process considers basic shape and color information of the photo when looking through the database for potential matches of similar photos. Several factors make this matching process difficult. The query image is typically different from the target image, so the retrieval method must allow for some distortions. Since these are natural photos taken in natural environments, the photos may suffer artifacts such as color shift, poor resolution, dithering effects, and mis-registration. Furthermore, it is important to perform the retrieval fast enough to not hamper user experience of the media-product creation process.

When the images are first received by the server, a wavelet transform 2D204 is performed on every image in the image database 2D202. By collecting just the few largest coefficients from this transform, the process distills a small "signature" for each of the images. These signatures are saved in a signature database 2D206 so that it is computationally efficient to compare them all to each other.

When the process 2D200 requires photo(s) of similarity to a given query image 2D208, the process performs a wavelet transform 2D210 on the query image 2D208 to produce a signature 2D212 for the given query image 2D208. This query signature 2D212 is compared to the signatures of the database images 2D206, and the best matches are retrieved by the process 2D200 for use in automatically creating, organizing, and presenting the media-based project to the user.

The wavelet transform is used to analyze functions at different levels of detail; it is somewhat similar to the Fourier transform, but encodes both frequency and spatial information. By saving the few largest wavelet coefficients for an image (and throwing away all of the smaller coefficients), it is possible to recover a fairly accurate representation of the image. This property may be exploited for efficiency gains to optimize image similarity comparisons. For example, a wavelet transformed image ("signature") that incorporates 400 coefficients would require about 3% as much disk space as the original image. In one embodiment, it is possible to take a wavelet transform and keep just a few (for example, 20) coefficients for each color channel and distill from them a small "signature" for each image. Because the signature is so small, it permits very fast searching in the database.

Image Analysis Embodiment of the Invention

Illustrative Example

In order to create an exceptional customer experience and create a photobook or other media-based product that is ready to go, in one embodiment the invention mines photos, meta-data, use-case, and user data to extract useful information that will allow the process described here to decide how best to auto-create the media-based product. In summary, three pieces of information, or any subset of this information, may be used to auto-populate the media-based product: (1) image analysis (including meta-data in images), (2) use-case analysis, and/or (3) user analysis. An illustrative example of each is now discussed.

Image Analysis (Including Meta-Data Analysis)

First, image analysis, auto-corrections/auto-adjustments, and meta-data extraction is performed. By leveraging computer vision, the process can extract relevant information from a photoset and perform automatic adjustments. Some examples are described below:

Analysis
    Detect similar photos
        For example, by using the similarity algorithm discussed above.
    Detect faces in photos
        Smiling, blinking, etc.

-continued

>   Identify the people in the photos (allow us to group by faces)
>     For example, in a wedding book, who is the bride and groom?
>   One-off characteristics detection
>     For example, in this wedding book, which photos have the bride in her dress?
>     For example, in this travel book, which photos, if any, take place on a beach?
>   Detect undesirable photos, and remove them from the photobook
>     Blurry photos
>     Bad lighting
>     Eyes closed
>     Etc.
>   Detect where the focus and important part of the image is
>     For example, image saliency detection
> Auto-corrections/auto-adjustments
>   Auto-orient photos for users
>   Auto adjust photos for color/brightness/contrast/etc.
>   Automatically fix redeye
>   Other auto-correction/auto-adjustments
> EXIF metadata
>   For example, prepopulate a wedding date from the date when the most of photos were made.
>   If photos contain GPS coordinates (most smartphone photos do), extract (reverse geocode) country/city/resort name if it is a travel book, and pre-populate a book name. For example, "Lake Tahoe 2012."
>   EXIF data might include, but is not limited to:
>     Manufacturer of camera
>     Model of camera
>     Orientation (rotation)
>     Software
>     Date and Time
>     YCbCr Positioning
>     Compression
>     x-Resolution
>     y-Resolution
>     Resolution Unit
>     Exposure Time
>     FNumber
>     ExposureProgram
>     ExifVersion
>     Date and Time (original)
>     Date and Time (digitized)
>     ComponentsConfiguration
>     Compressed Bits per Pixel
>     Exposure Bias
>     MaxApertureValue
>     Metering Mode
>     Flash
>     Focal Length
>     MakerNote
>     FlashPixVersion
>     Color Space
>     PixelXDimension
>     PixelYDimension
>     File Source
>     InteroperabilityIndex
>     InteroperabilityVersion Use-Case Analysis Second, a usecase of the book is obtained, either manually by asking the user, or automatically through one or more heuristics. By asking the user for the usecase of their book, the process can do a better job of improving the processes used to build the book for the user. For example, in the "wedding" usecase, the process can append additional heuristics to:

Identify photos with the wedding cake

Identify photos with the alter

Determine if the photos are chronological

Add special text boxes throughout the book such as a place to label the "groom" and the "bride."

Some examples of use cases which a user may manually select or which may be determined through automatic heuristics include, but are not limited to:

>   Wedding
>   Travel to countries, cities, climates, etc.
>     travel to tropics
>     travel to Africa
>     travel to Paris
>     travel to the beach
>     etc.
>   Night Out on the Town
>   Hanging out with friends
>   Baby
>   Year in review
>   Water—fun by the pool, beach, lake, etc.
>   Snow—ski trip, playing in the snow, etc.
>   Road trip
>   And so on User Analysis Third, user analysis is performed on the expected user of the finished product. By leveraging FACEBOOK™ connect, or other social media platform, the process can use information about the user to help automatically detect different properties in the photo set. For example, if a user logs in with FACEBOOK™, the process can examine the user's profile picture to get a sample of his or her face. From this, the process would know which photos in a set are of the user. If, for example, the process knows the user wants to make a wedding book (use-case) and the user's face shows up the most out of anyone else and the process knows they are a male (from FACEBOOK™), then the process can infer that this person is a groom.

Some examples of user data which may be determined through automatic processes such as those described above (or which a user may manually enter) include, but are not limited to:

>   Gender
>   Age
>   Location (geolocation and/or city/state)
>   Relationship status
>   Friends
>   Schools attended
>   Physical characteristics (height, weight, etc.)
>   Facial features
>   And so on Object Detection Examples According to the present invention, various image analytics may be used to detect various objects in the image data. These image analytics may be configured to detect any number of objects. Some illustrative objects are listed below. However, the present invention is not limited to these objects, and various object detection processes may be used to determine one or more objects within the images and group based on the detected objects, and are all within the scope of the present invention:

>   Presence of people
>   Presence of pets
>   Wedding cakes
>   Vehicles
>   Groups of people
>   Sizes of objects
>   Face detected (a face is a close-up of a person)
>   Type of vehicle detected (SUV, car, convertible, etc.)
>   Animals
>   Structures (for example, Eiffel Tower, pyramids, wedding chapel, etc.)
>   Sport items (for example, basketball, football, volleyball, etc.)
>   Landscapes
>   Indoor vs. outdoor Nighttime vs. daytime Nature features (for example, trees, lakes, beaches, etc.)

And so on

The functionality as described in the present disclosure enables the processes of the present invention to answer the following intelligent questions automatically, and utilize the resulting answers to pre-populate and intelligently customize the media-based project, such as a photobook.

Q. If a user takes 5 photos of the same group people of people one after another, which one is the best?

A. Photo querying and similarity comparison coupled with timestamp and geo-data will help determine that these photos form a group. Once this is known, the process can use face detection to detect the faces. Once it is known where the faces are, the process can use feature detection to detect "pleasant faces," or faces where both eyes are open and they are exhibiting a smile.

Q. Sometimes users take bad photos and don't delete them. How does the process know not to include them in the book?

A. For blurry photos, the process performs edge detection to see if the process can detect any sharp edges, if the process can't locate sharp edges, there is a good chance the photo is blurry. The process can either remove this from the auto-book creation or it can prompt the user to decide.

Q. How does the process know which photos in this batch of wedding photos have the bride and groom?

A. Using face detection, the process can apply identifiers to each face so it knows that person A shows up in 85% of the photos, person B shows up in 73% of the photos and person C shows up in 20% of the photos. Therefore, person A and B are most likely the bride and groom. Then the process can use further feature detection to guess who the bride and groom are. For example, the groom is probably not wearing a dress. The process can use classifiers to see who is wearing a dress.

Q. In a travel book, how does the process know what kind of style should apply to the book?

A. The process can use machine learning to create classifiers and determine if the photos involve beaches, palm trees, and sunny skies. If they do, there might be a good chance the process should apply the "Tropical Paradise" styling package.

Q. How does the process know how to position photos in a photo slot?

A. By applying saliency filters, the process can draw a bounding box around the focus of an image. This will work well on not only objects, but people as well. So if the objects are on the sides of the image, the process can zoom the photo into that area.

Q. How does the process fix the red-eye in the photos or any color issues?

A. The process can create a second version of a photo that applies image processing filters to improve images and remove redeye.

Illustrative Alternative Embodiments of the Present Invention

Various illustrative alternative embodiments in which the present invention may be practiced are now discussed.

Figure 2E:
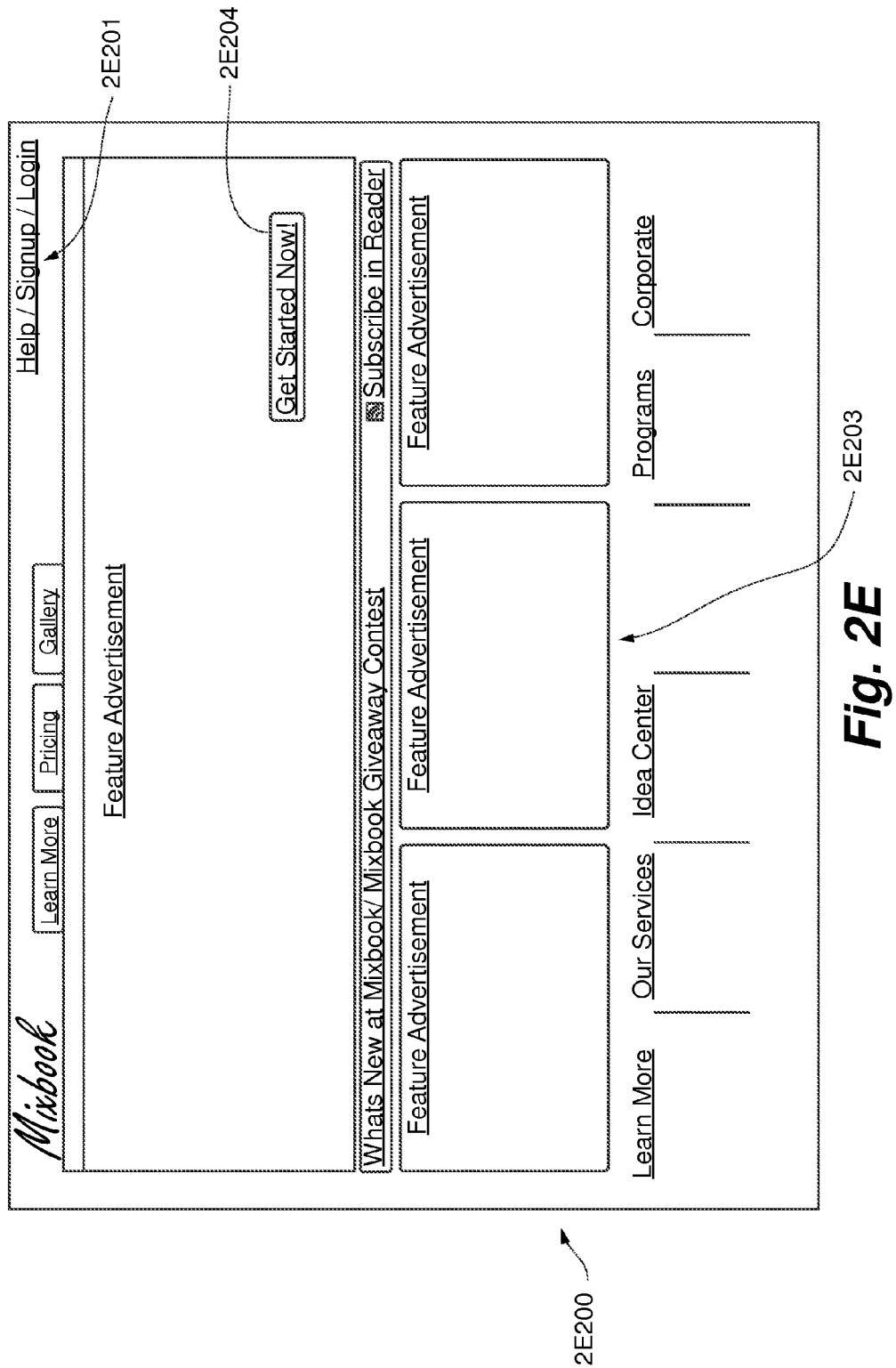
FIG. 2E is an exemplary screen shot of an introduction page of the website of FIG. 1W, according to an embodiment of the present invention.

FIG. 2E is an exemplary screen shot of an introduction page 2E200 of website 1W2106 of FIG. 1W according to an embodiment of the present invention. Introduction page 2E200 includes interactive indicia 2E201, which includes an option for retrieving help, signing up for service, and for logging into the service. On the same title bar containing the interactive indicia 2E201 for signing up or signing into the process, there are the navigation options Learn More; Pricing; and Gallery. The option "learn more" leads to additional information about the services provided, such as product quality, use cases, etc. The pricing option brings up one or more complete pricing structures for the available products that can be created and printed. The option Gallery is an option that provides access to completed projects authorized for public viewing.

Page 2E200 contains more than one feature advertisement 2E203. Each feature advertisement may comment or provide some input, access to, or information about a feature of the service or fact about the providing company. In the first feature advertisement (center top) there is an interactive option 2E204 for getting started now. Invocation of this interactive link may launch a registration or sign-up process followed by an opportunity to begin a MIXBOOK™ project. Hyperlinked information is provided on introduction page 2E200 under categories such as Learn More, Our Services, Idea Center, Programs, and Corporate.

In one embodiment, page 2E200 includes an option "try it now", which may be replace option 2E204. Invoking such an option may take the "guest" to a MIXBOOK EDITOR™ without requiring them to login or have an account with the site. Transparent to the user, the system creates a temporary account for them. If the new guest user attempts to save any work on the site they are asked to register as a user.

Figure 3:
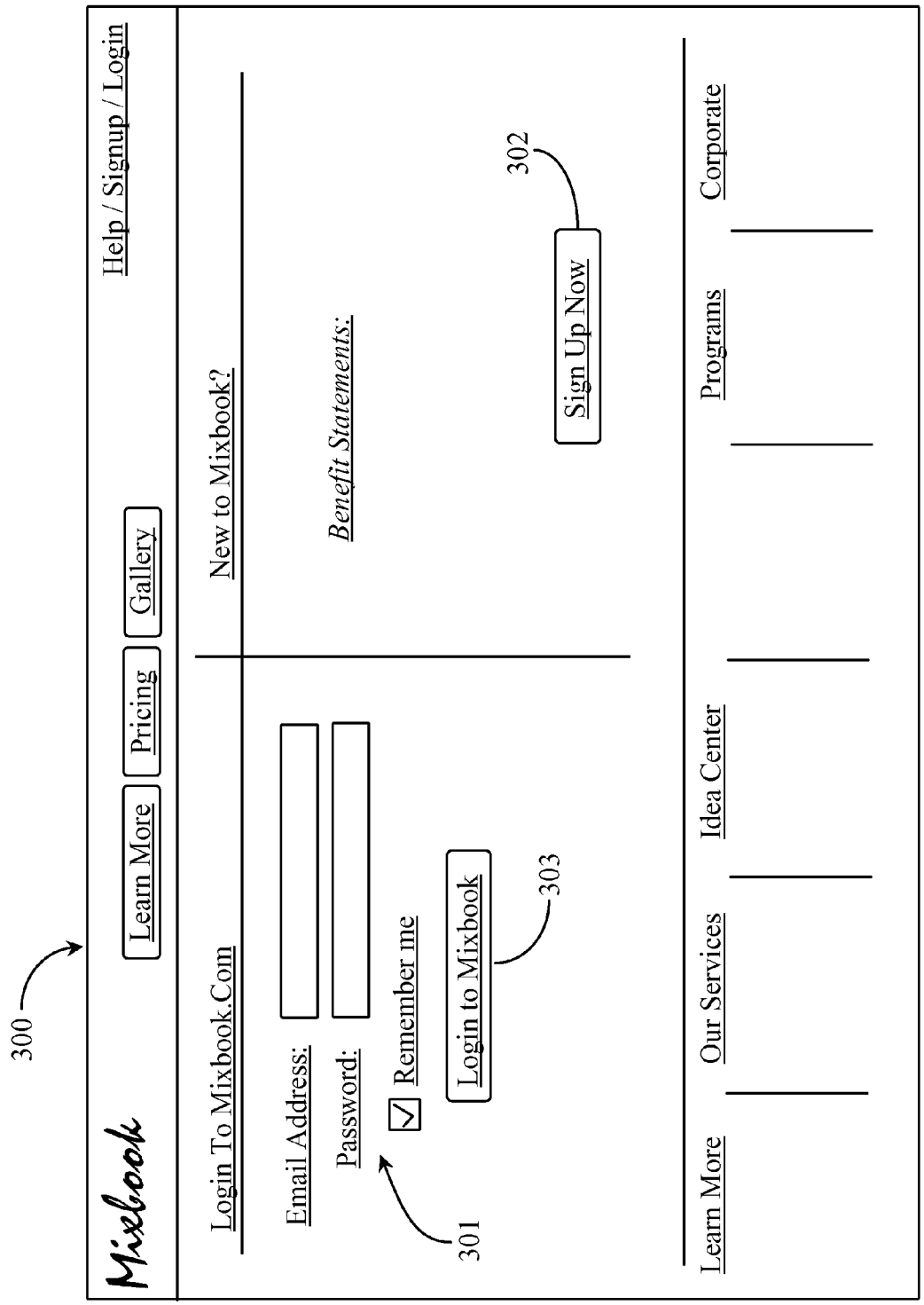
FIG. 3 is an exemplary screen shot of a login/sign-up page presented to a user as a result of interaction with the introduction page.

FIG. 3 is an exemplary screen shot of a login/sign-up page 300 presented to a user as a result of interaction with the introduction page. Login/sign-up page 300 includes a log-in interface 301 for entering an email address and password for authenticating the user to use the site. A login button 303 is provided for submitting the authentication data and logging onto the site. If a user has reached page 300 and has not yet signed up for the service of the present invention, the user may be presented with various benefit statements and a signup now button, which when invoked calls up a registration interface.

Figure 4:
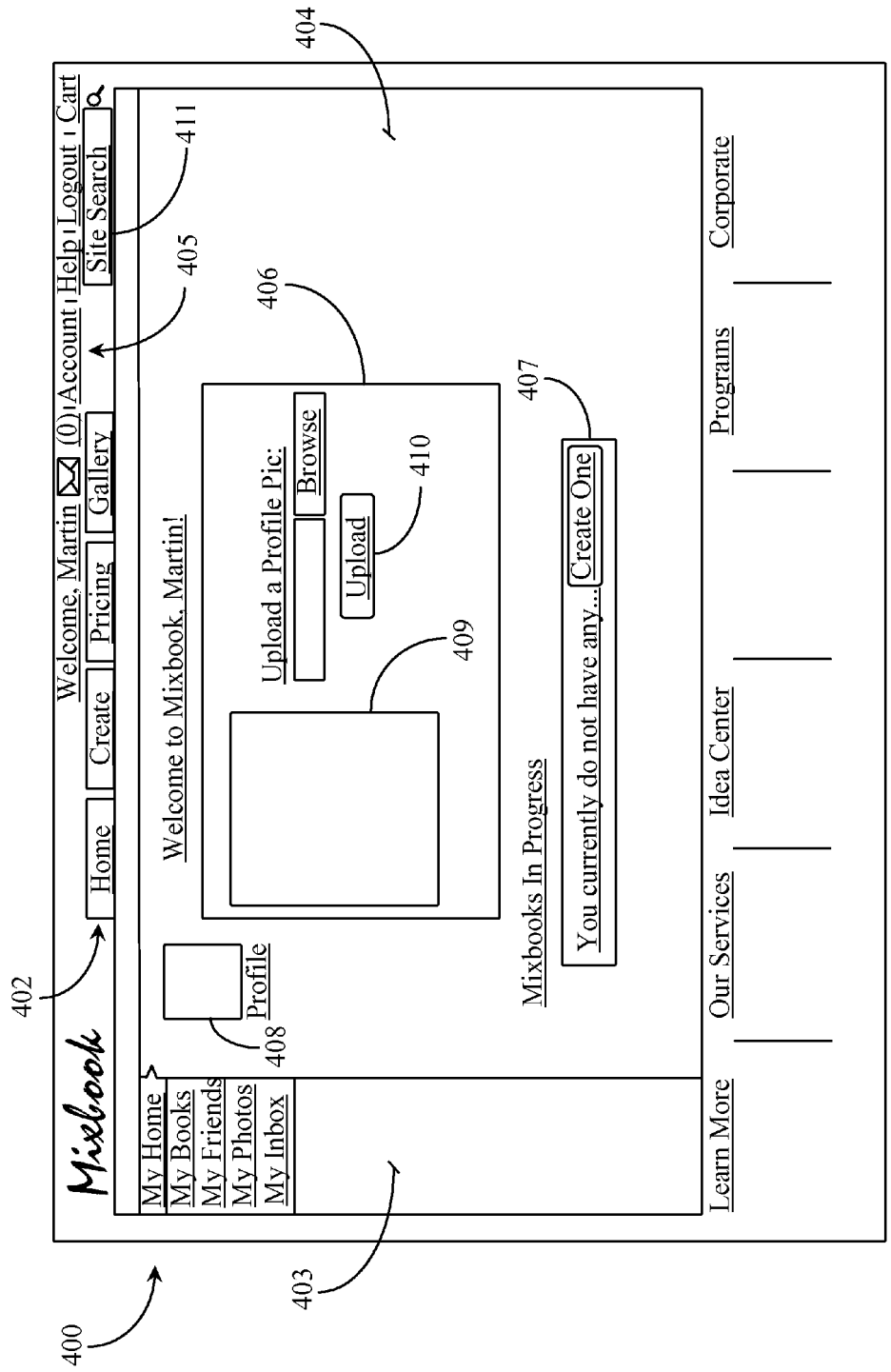
FIG. 4 is an exemplary screen shot of a welcome page presented to a user as a result of successful login to the site.

FIG. 4 is an exemplary screen shot of a welcome page 400 presented to a user as a result of successful login to the site. Page 400 is a welcome home page personalized for the user. Page 400 includes navigation options 402 including the locations Home, Create, Pricing, and Gallery. The link Pricing takes a user to a pricing page detailing different prices for ordered products. The Link Gallery take a user to a gallery of public MIXBOOK™ products created by community members who have given permission to view their created products.

Page 400 includes a personal welcome and may also include information 405 including status indication of an email account provided to the user as part of the service. Information 405 also includes account information, a Help option, an option for logging out, and a link to a shopping cart for purchasing MIXBOOK™ products. A user may purchase products created by that user or products created by others that the user is authorized to purchase. Page 400 includes a sidebar area 403 that includes several navigation links such as My Home, My Books, My Friends, My Photos (uploaded) and My Inbox (provided mail account).

Page 400 includes a workspace window 404 that contains an interface 406 for uploading a picture for creating a profile. Interface 406 includes a data entry field to enter the path of a picture or the user may browse the commuting appliance for a profile picture. An upload button is provided to effect upload of a profile picture. A place holder 409 is provided to display the uploaded picture. After creating a profile and uploading a profile picture, the profile picture appears as a profile link 408. Page 400 has a site search button 411 adapted to enable that user to search the Website using a keyword or phrase.

Page 400 includes a status report or listing 407 that tells the user what projects are active or available to the user. This may include projects created by the user and any projects initiated by others that the user has authorized access to. In this example, the user has yet to create a MIXBOOK™ product. Listing 407 includes an interactive command option (Create One) for creating a product such as a photo-book for example.

Figure 5:
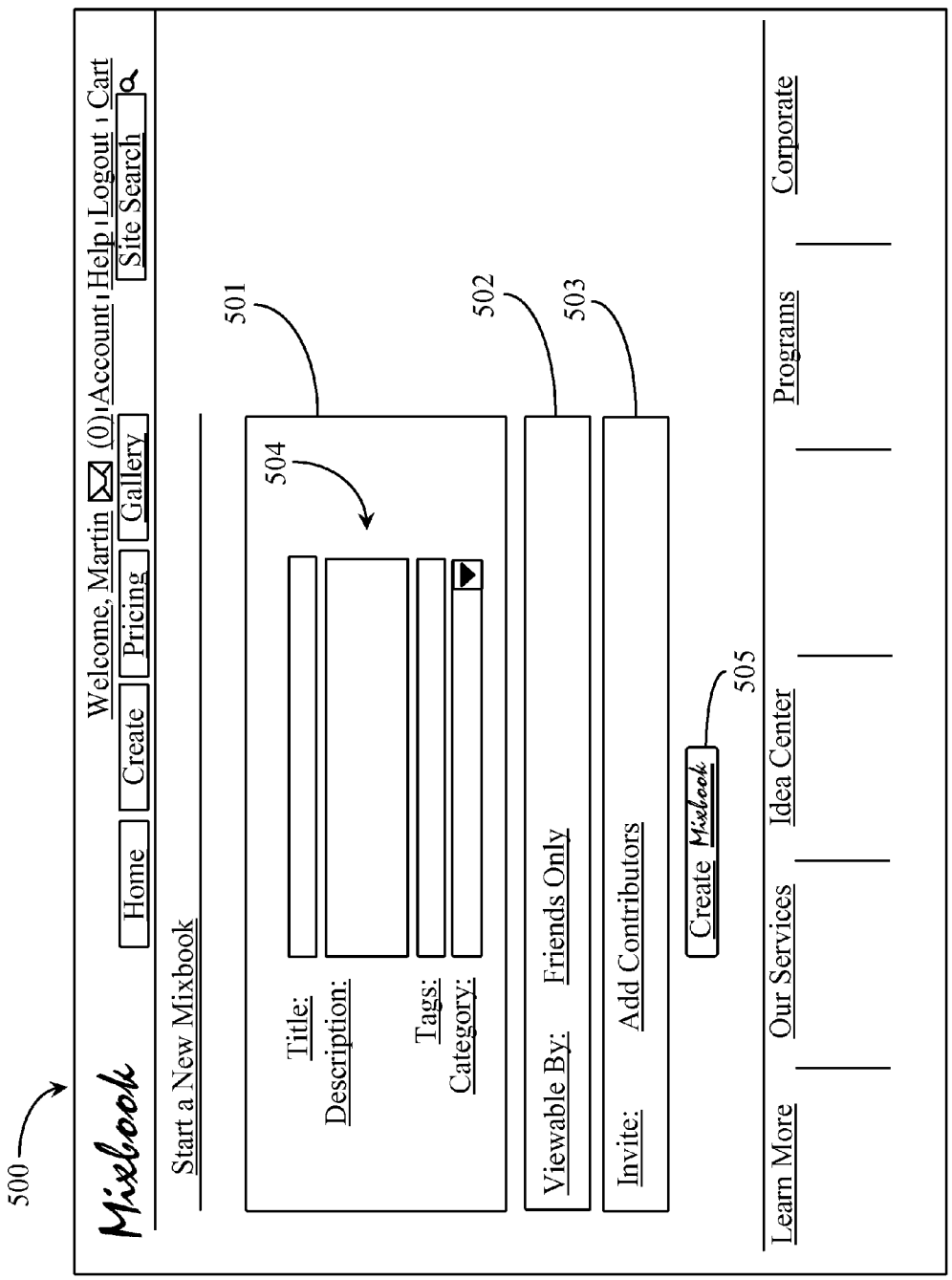
FIG. 5 is an exemplary screen shot of a project configuration page presented to the user as a result of interaction with the Create option of the page of FIG. 4.

FIG. 5 is an exemplary screen shot of a project configuration page 500 presented to the user as a result of interaction with the Create option of the page of FIG. 4. Page 500 includes a workspace window 501 for entering information about a project that a user wants to initiate. Information fields 504 include a project title field, a project description field, a field for entering tags for the project, which may be used later by friends of the user or by other community members to search for the project. Fields 504 also include a category field for selecting a category of a project.

A configuration option 502 is provided for electing who may view the proposed project. In this example the project will be viewable by friends of the user. An invitation window 503 is provided for enabling the user to invite or add contributors to the project. A contributor is any of the user's friends or any other community member that the user invites to contribute. In one embodiment a project may be initiated by a user and may be designated open to all contributors or all of the site's community members. Online community members represent an active network established to aid book creation.

The inventors emphasize the idea of a community that develops around creating projects such as photo book. More importantly the system streamlines the act of starting projects by creating a social interaction network on the site to help propagate book creation. For example, by linking with friends and family on the site, the user can utilize the platform for inviting other site users to collaborate on a project such as a photo book with them, rather than having to enter their email addresses. Members of this network are community members termed "Friends" from the perspective of an inviting user.

When the user begins a project such as a photo book and enters book information, the user is enabled to select members from his network (friends) already registered with the site to help work on it. This allows the user to quickly select the appropriate members to contribute material to the book without having to enter their email addresses.

The system of the present invention enables real-time collaboration. Users may interact with one another in real time as they collaborate on a project. A user may be a contributor without necessarily collaborating in real time with the creator or other users on a project. The transparency of collaboration is such that users may communicate with each other while working on a particular book and may also view real-time editing and creation of that book while it is happening.

As multiple contributors work on a multi-page project such as a photo-book for example, they are able to view the edits made by other users in real time such as adding, changing, and removing pictures and text. For example, a user that is viewing a page that a contributor is working on will see a picture move or some other changes happening on the page in real time.

The system supports presence reporting so any user can see real-time status of all the other current contributors or editors of the project and may invite any of them to collaborate on the page(s) the user is working on. When two users are on a same page, they can annotate and change the page in real time, and see each other's mouse cursors in real time as they move across the screen. When a user selects friends and/or family to contribute to a project such as a photo book at the time project initiation or by selecting the collaboration feature after the book has been started, those selected friends or family will be sent automated invitations to contribute to the selected book. Once a friend or family member accepts such an invitation they will automatically be approved as become a contributor of the book.

Members of the network who are contributors to a project will be able to add various materials to the project including but not limited to photos, videos, text, and pages that have already been created on the site. When a new project is created the creator and/or contributors of the new project such as a photo book may take pages from other existing photo books on the site and may use them in the new book. In this way, many different projects may use the same project pages. When members become contributors to a book they have the option of adding any pages that they have previously created on the site in addition to pages of their friends that they have permission to use and any publicly available pages on the site. Adding pages from other projects can be done two different ways.

In one embodiment a same page added to a project that exists in one or more other projects may be referenced so that any changes made to that page affect every project that has this page present. In another embodiment a same page found in another project and contributed to the new project is copied so that any changes made to the copy will not propagate to the original page. Members of the site may search public projects and pages and may use any public pages they find on the site. A public page is a page created by a member of the site that is allowed to be used by any member in any book. Users will have the option to use these pages in any book that they create or contribute to. In one embodiment part of a project may be public while other parts of the project are held private. A public page may be embedded in a project that has pages private pages not made public.

A server such as RS 109 of FIG. 1 facilitates transfer of information between users collaborating in real time on a project. For example, if five collaborators are in the process of editing a book, the server can use open socket connections to read when each user is making a change and then push the change data in an unobtrusive way to the other collaborators. The MIXBOOK™ editor (MBE) enables live messaging between users or friends that are currently collaborating on a project whereby all of the users are using the MBE. In this way users may exchange ideas, tips and other information as they edit a project together.

Invitation window 503 may be expanded to enable a user to view any of the user's friends that are registered with the service as "friends" of that user. In one embodiment those friends are flagged as being "Online" or "Offline" using a suitable presence protocol. In both instances, a user may invite any of the "online" or "offline" friends to contribute or collaborate in real time on a project. One invitation may be sent to multiple users. When a user receives an invitation to collaborate on a project, the invitation may appear as a pop-up window, or some other visual that identifies the sender and the nature of the project. An invitation may also contain a text body describing the project and what type of collaboration is desired. A create MIXBOOK™ button is provided to continue the process of book creation. Invoking button 505 calls up a next screen adapted to enable the creator to select the size (form factor) of the project.

In one embodiment users may form groups around areas of interest. In this embodiment a user that belongs to a group created around a subject of interest may start a new project such as a photo book relating to the subject around which the group was founded by clicking on a "start new book" button on a main page established on the site by the group. The group project initiation automatically included the group members as collaborators. This represents yet an additional way the community network is leveraged as way to propagate more project creation.

Figure 6:
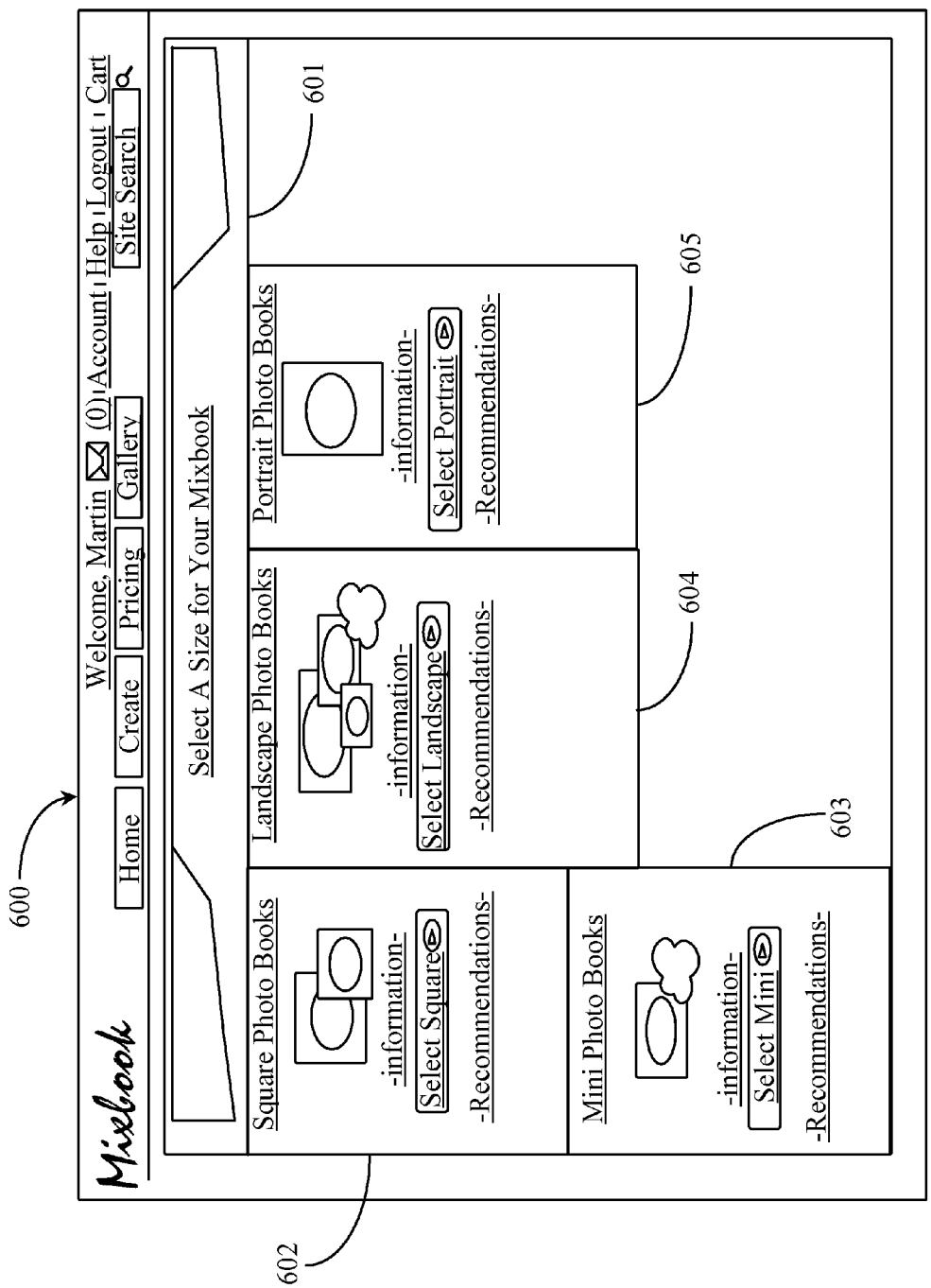
FIG. 6 is an exemplary screenshot of size-selection page for selecting an initial orientation and size for a project.

FIG. 6 is an exemplary screenshot of size-selection page 600 for selecting an initial orientation and size for a project. In this example, all of the project options are for multiple page photo books. Other project options may be made available to a user without departing from the spirit and scope of the present invention such as a photo card, a poster board, or some other type of publication that utilizes photos and/or and text.

A banner feature advertisement 601 states the intent of page 600 of helping the user to select a size for a MIX-BOOK™. The feature advertisement may include text information (not illustrated) that informs the user that the service is free for creating and publishing a project and that printed materials begin at a specific price range. A user may also click on "Pricing" at the top of the page to determine what the current prices are for printed projects.

Page 600 includes an option 602 for selecting a square photo book that can be printed in two available sizes. Although not illustrated, the exact sizes which are exemplary only are twelve inches square and eight and one-half inches square for a square photo book. Other sizes may be offered for a square book without departing from the spirit and scope of the present invention. Option 602 includes information that the book may be ordered in soft or hard cover. Option 602 includes recommendations that are not specified in this example but may include what the system recommends selection of a square book is best for such as, best for a storybook (baby), a digital scrapbook, or a photo book that is shared online.

Page 600 includes an option 603 for selecting a mini-photo book that is a landscape orientation and that is only available in one printed size. Although not illustrated here the exact size of the mini photo book is six inches by four inches. Option 603 includes information that the book may be ordered in soft cover only. Option 603 includes recommendations that are not specified in this example but may include what the system recommends selection of a mini book is best for such as, family brag book, portable photo album, or gifts. An additional piece of information is represented by an information cloud adjacent to the mini-book sample. In one embodiment this additional piece of information may be pricing information. The information contained in the information cloud may also be some other type of useful information without departing from the spirit and scope of the present invention.

Page 600 includes an option 604 for selecting a landscape photo book that can be printed in three available sizes. Although not illustrated here the exact sizes which are exemplary only are fourteen inches by eleven inches, eleven inches by eight and one-half inches, and eight inches by six inches. Option 604 includes information that the book is available in hard cover or in soft cover. Option 604 includes recommendation by the system that selecting a landscape book is best for wedding photo books, guest photo books, or a photography photo book. An additional piece of information is provided in an information cloud associated with the medium sized landscape sample illustrated in option 604. In one embodiment the information in the cloud designates the sample as the most popular size of landscape book. Other types of information may be tagged to the samples using an information cloud without departing from the spirit and scope of the present invention.

Page 600 includes an option 605 for selecting a portrait photo book that can be printed in one size of eight and one-half inches by eleven inches. Option 605 includes recommendation by the system that selecting a portrait size is best for creating a class yearbook, a team or group yearbook, or a child's storybook. It should be noted herein that the offered sizes in the different orientations are not intended to be limiting in any way. A number of other sizes might be envisioned for print for any orientation without departing from the spirit and scope of the invention.

Figure 7:
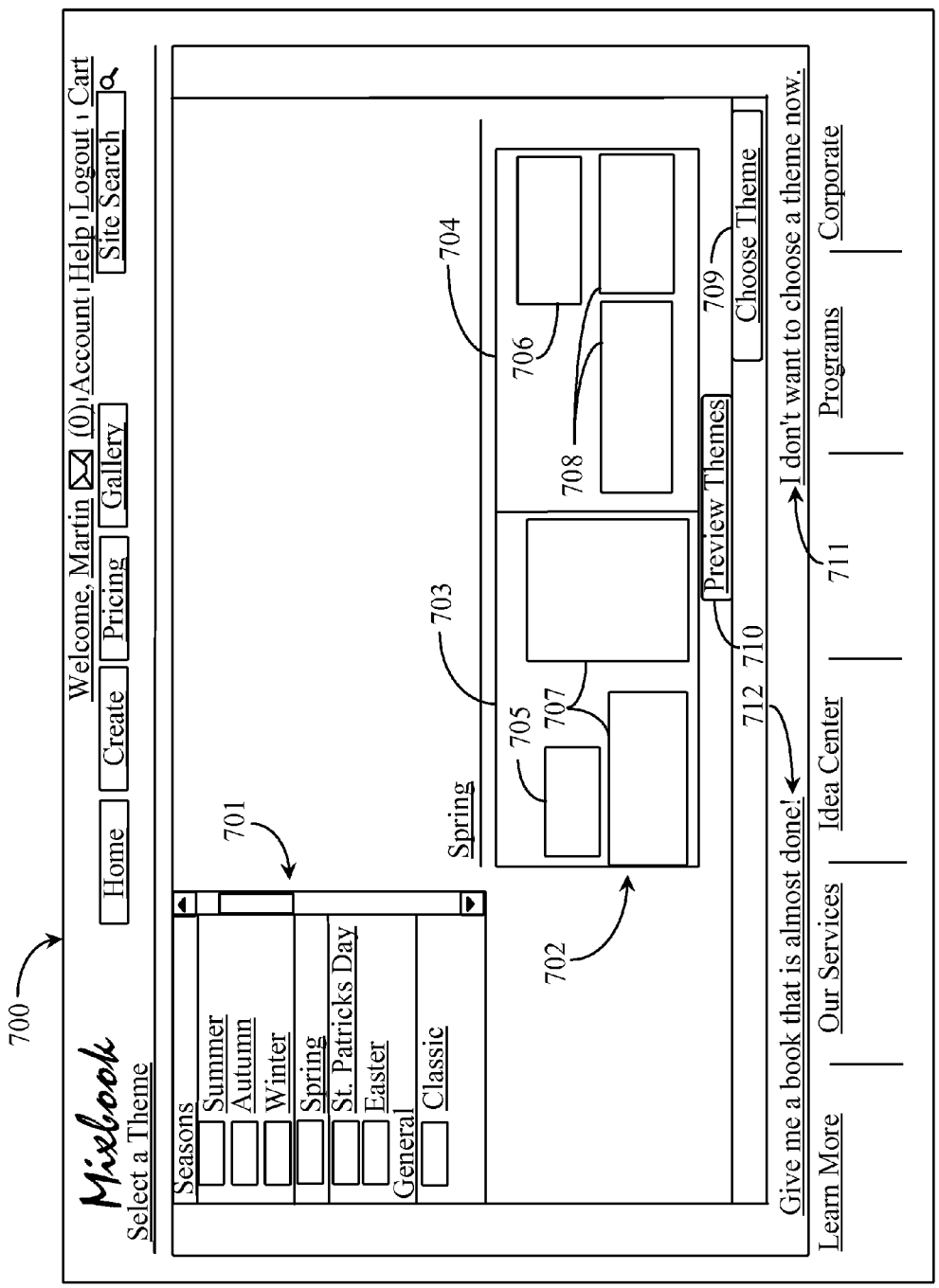
FIG. 7 is an exemplary screen shot of a theme-selection page for selecting an initial theme for a project.

FIG. 7 is an exemplary screen shot of a theme-selection page 700 for selecting an initial theme for a project. Theme-selection page 700 includes a scroll menu 701 that contains a number of themes that a user may select from for use in a project. In typical order, theme selection may take place immediately after size and orientation selection when configuring project parameters. Illustrated in the visible portion of the window are themes for "Season" including Summer, Autumn, Winter, Spring, Saint Patrick's Day, and Easter. Themes listed under "General" include Classic. Other theme categories might include Wedding, Travel, Baby, Family, Occasion, Holiday, Romance, and Education among many other possibilities. In one embodiment a user may create a new theme.

In this example the theme Spring under the category Seasons is selected. Page 700 includes a preview pane 702 adapted to show the theme layout suggested for the size and orientation of the project being created. A layout in the preview pane 702 includes a page 703 on the left and a page 704 on the right. On page 703 there are two photos 707 and one text box 705. On page 704 there are two photos 708 and a text Box 706. All of the photos are those that come with the sample that the user has selected from menu 701 (sample photos).

A user may select preview theme by invoking option 710 to view a theme in the form of the intended product. The user may then select another theme from theme pool 701 for preview until the user selects a theme they want. A user may choose a theme by invoking a choose theme button on the Website. When the user invokes this option the theme will be incorporated into the project template. A user may invoke option 710, which is an option not to select a theme. A user may also invoke an option 712, which requests that the system load a project of the selected size orientation and theme with suggested stickers, backgrounds, and photos (if applicable). Invoking the choose theme option 709 moves the project to the editing stage.

Figure 8:
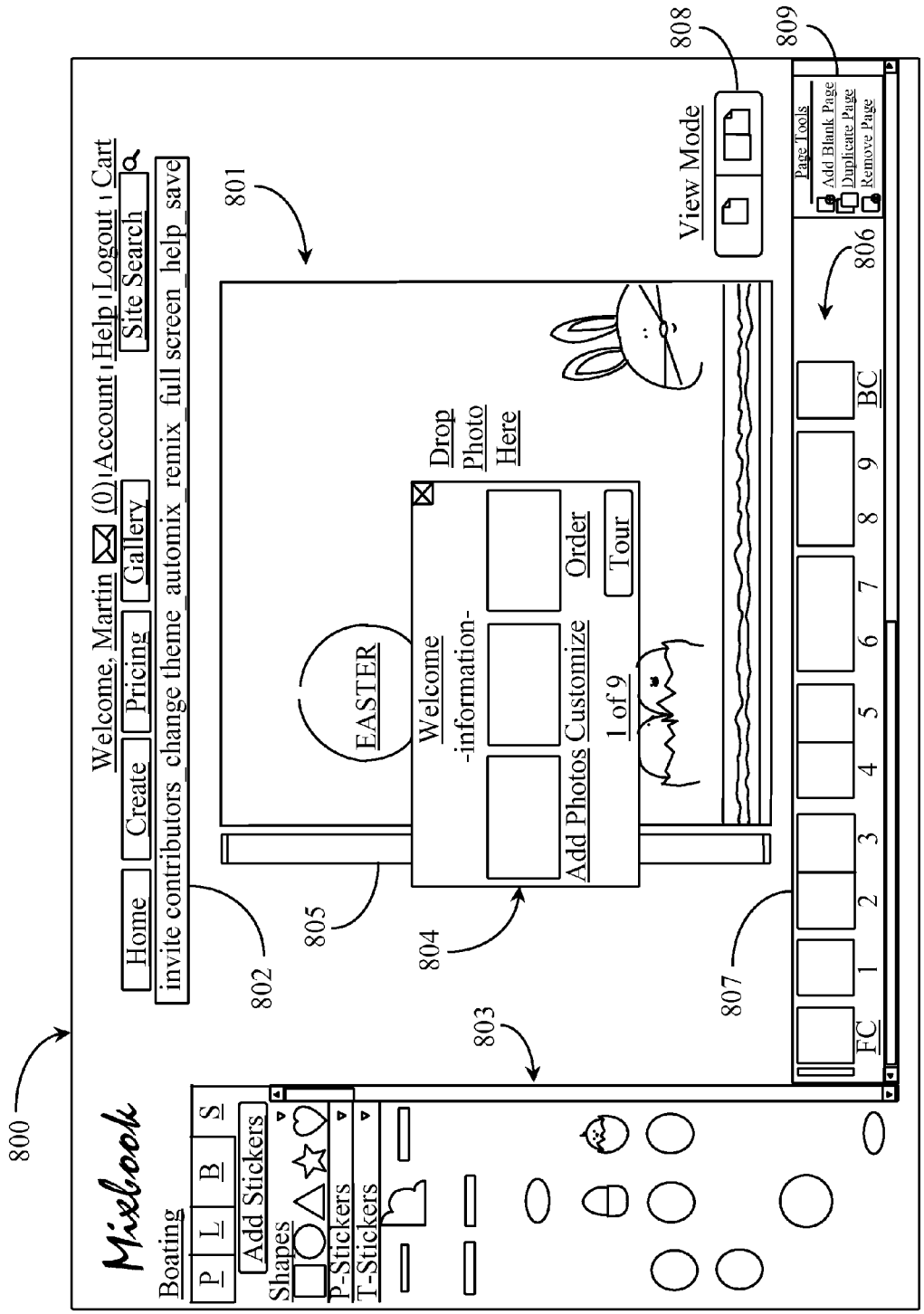
FIG. 8 is an exemplary screen shot of a MIXBOOK Editor™ (MBE) user interface (UI) for editing a project in progress according to an embodiment of the present invention.

FIG. 8 is an exemplary screen shot of a MIXBOOK™ Editor (MBE) user interface (UI) 800 for editing a project in progress according to an embodiment of the present invention. UI 800 includes some of the options presented on previous pages including a personalized welcome, an inbox mail indicator, an account option, a help option, a logout option, and a link to a shopping cart. Also present from previous pages are the navigation links to Home, Create, Pricing, Gallery, and Site Search.

An information bar 802 contains an array of selectable options invite contributors, change theme, automix, full screen, help, and save. It is noted herein that the system of the present invention initiates and completes auto saves to a user's MIXBOOK™ project at opportune moments such as when the user changes pages within the project when editing. In this way the most data a user may lose is data on one project page.

By triggering a save event on specific actions the system mitigates a user's loss of data in the event of software crashes and other catastrophic events. This system works by persisting the canvas (page) data to the runtime server from the client via a client/server communication channel such as an Action-Script Message Format (AMF) remote framework, which transfers AMF data between the client and the server. This pull system mitigates the amount of work a user could potentially lose on a project to just one canvas page worth of data. It also drastically simplifies the process of creation by removing a recurring step.

In one embodiment, the auto-save feature activates whenever a page is swapped out in the viewing window or "viewport" of the GUI editor. Various other auto-save triggers may be configured and triggered according to established rules. In one example, the auto-save feature triggers when a specific amount of time elapses while they are working within the editor. In one embodiment the auto-save feature triggers when a pushed event is received by the client that informs the client that the site is going down or for any reason. In one embodiment the auto-save feature triggers when a specific copious amount of changes are made on a single page without save, a threshold established to define the amount or weight of the changes made.

The automix option in information bar 802 is an automated process driven by an algorithm. Automix takes the user's photos and dynamically creates new pages based on the project's theme and the size, orientation, and metadata of the user's photos. UI 800 has a side bar area 803 that contains assets that may be used in creating the project. Sidebar 803 is scrollable and includes at least four interactive presentation controls, each representing a category of assets, which when invoked provide access to certain assets under each category represented. The control furthest to the left of the Fig. labeled P for photos. Invoking Photos loads all of the user's uploaded photos into the scrollable area for use in the project. The next control to the right labeled L is for layouts.

A layout is a page or spread configuration containing photo slots and text boxes along with shapes and stickers that go with the theme of the project. Under layouts, there are sub-categories for project layouts, theme layouts, and recommended layouts. A layout may be a system provided layout or one that is created by a user from scratch elements. A next control over to the right is labeled B for backgrounds.

A background is a page background that underlies the added content. When a background image is stored by the system, the system, in one embodiment, creates a mirror image of that background by default. This unique process is termed background "flipping" by the inventor. By default, all background images are stored as "mirrored images" (original and flipped version). In this way when a user selects a particular background image for two adjacent pages, the flipped image is used as the second background image and may be auto-inserted onto the page. For assets that display one or more asymmetric aspects, background flipping provides a more aesthetic look to a two-page photo book spread. Flipping of assets (storage of mirrored images) may be practiced by default on backgrounds, layouts, photos, and stickers without departing from the spirit and scope of the present invention.

In one embodiment, an algorithm drives the background flipping process by first identifying a background image that is asymmetrical in characteristic such as having an asymmetric coloring, texture, pattern, etc. Any images that qualify are flipped meaning that a mirrored-image copy of the original is created and stored alongside the original. In addition, the system automatically serves a "flipped" image where useful such as when a two-page photo book spread will use the same background image. The left canvas would contain the original background image while the right canvas would contain the mirrored image auto-inserted when the background was selected by the user for application to the spread.

The next control furthest to the right is labeled S for stickers. The system maintains clip-art called stickers comprising shapes and other clipart images used as content to dress a layout on a page. The category of stickers includes shapes, project stickers and theme stickers. Project stickers are those that are currently being used in a given project and theme stickers are those that are considered relevant to a project theme. Sidebar area 803 serves as a content interface within UI 800 that provides access to all content whether it is system-provided or user-provided.

In one embodiment the system of the invention includes a recommendation engine driven by several different algorithms that intelligently recommends content according to several different criteria. For example, certain theme-related stickers might be recommended to a user based on the theme selected for a project. If the project theme is babies, then baby related stickers known to the system would be displayed to the user ahead of any other sticker types. In another embodiment a hierarchal recommendation system is provided whereby the system makes suggestions or recommendations of content based on number of times the content is used by others, commented on by others, ranked by others, and so on. Using a recommendation system helps expedite the project creation process by displaying the most relevant or used content assets to the user first so that the user does not have to search or browse for relevant content assets to include in a project.

In one embodiment a method for selecting a photo from a plurality of photos placed in the project by a project contributor for recommendation includes (a) accessing the contributor's project photos stored in the database, (b) weighting data associated with each photo used in the project against one or more business rules, (c) selecting one or more photos based on the weighting results of step (b); and (d) recommending one or more photo products containing one or more photos selected at step (c) to the contributor at an appropriate time.

In a preferred embodiment, stickers such as shapes may be adapted as photo-viewing windows or "photo-slots" complete with all of the unique properties of a photo-slot such as access to the photo panning tool, photo-edit tool, and other tools for editing. Shapes may also be used as text boxes. There are many possibilities.

UI 800 includes a content storyboard 807 that displays all of the pages and, or "spreads" 806 of a project in sequence at the current edited states of those pages or spreads. A spread is simply two or more single pages connected as a spread of pages. Storyboard 807 is scrollable and may contain as many pages as are included in any project. A user may click on any of the pages or spreads in storyboard 807 to bring it up for active display and editing. A user may select a viewing mode 808 (bottom right) for viewing a single page or for viewing a page spread. A page tools interface 809 is provided in UI 800 to enable simple page manipulations such as adding a blank page, duplicating an existing page, and removing an existing page from the storyboard.

In this example the front cover 801 and the spine 805 of a photo book are displayed for edit in UI 800. The front and back cover are considered pages but are not numbered in this example. Spine 805 is also considered a page. Interface 800 includes a welcome message 804 that may appear on display when the user invokes the editing process. The welcome message includes a warm welcome to the user followed by some general information about the service and expectations. The pop-up may prompt a user to add photos to the relative project, customize the project, and when satisfied with the project, order one or more printed copies of the project. In one embodiment a themed page already containing stickers and photo-slots can be added.

In one embodiment a user may remix a project that is in progress or finished. A page may be remixed by interacting with a remix option provided in toll bar 802. Remixing can be undertaken to change the various aspects of a page including but not limited to changes in layout of the page, changes to the background of the page, changes to the fonts of the page, and changes to the styles of items on the page. Remixing a page may also include adding or removing page items like stickers, photos, text boxes, and shapes. Remixing a page may also include changing effects or the current cropping of items on the page.

In one aspect all of a user's remixing efforts are undoable by clicking on an editing undo button or dialog box. A user may remix any number of pages any number of times. During the remix operation, a user may be enabled to include photo effects such as B&W, sepia, antique, and so on to all page photos. The user may also be enabled to include mean brightness and contrast adjustments on all of the photos in the remix and application of font on the page may be included to match as well. A layout change may source from a pool of layouts stored by the system. A layout change may also originate from an automated layout algorithm that automatically lays out all of the items on a page.

The automated layout algorithm described above may select a special layout and then may convert a group of photos into a canvas page. A specific layout may be chosen based on the corresponding photo group data by the algorithm which further minimizes the amount of zooming or scaling that must be afforded the photos. By minimizing the amount of scaling required, the resulting canvas page fits the photos into photo slots of similar orientation and subsequently requires very little zooming of the photos. This leads to higher quality output once a user chooses to purchase a created project in a high-dot per inch (DPI) output.

In one embodiment a flash tool for creating books is embedded in the editing system of the present invention. The flash window expands automatically to fill up the user's browser space when the user increases the size of the window. The flash window contracts to fit as well if the user decreases the size of the browser space. Using JavaScript on Resize events, the page creation canvas is adjusted in size to either zoom in to or out of the created book page as the user resizes their browser.

In one embodiment the system may access data quickly for display while uploading a bandwidth intensive file like a high resolution photo. Bandwidth is a precious resource on the Internet. Photos typically use a lot of bandwidth during transfer from one network location to another. While a user uploads photos, the system has the capability of accessing enough of the data using FP 10 to create stand-in thumbnails of the uploading photos so that a user does not have to wait before resuming the editing process. Once the photos are uploaded, they automatically replace the thumbnails and take on all of the attributes applied to the thumbnails in the absence of the real photos. In this way user will be enabled to work on a group of uploaded photos immediately using the thumbnails as a stand-in.

CONCLUSIONS

One of ordinary skill in the art knows that the use cases, structures, schematics, and flow diagrams may be performed in other orders or combinations, but the inventive concept of the background uploading of media files remains without departing from the broader spirit of the invention. Every embodiment may be unique, and methods/steps may be either shortened or lengthened, overlapped with the other activities, postponed, delayed, and continued after a time gap, such that every user is accommodated for background uploading of media files.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor coupled to a memory. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor.

The hardware operates under the control of an operating system, and executes various computer software applications, components, programs, codes, libraries, objects, modules, etc. indicated collectively by reference numerals in FIG. 1U to perform the personalization techniques described above.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A server, communicably coupled with a communications network, for automatically creating a photo-based project based on photo analysis and image metadata, the server comprising a processor, a data repository having multimedia content, and a non-transitory physical medium comprising executable instructions for:
    establishing a client-server connection between the server and a user-device connected to the communication network;
    receiving a plurality of images from the user-device, reading embedded metadata from the plurality of images, and storing said plurality of images in the data repository;
    performing user analysis on an expected user of the photo-based project based on data from a social media platform;
    performing photo analysis on the plurality of images in the data repository to determine a visual content and relevant metadata in the images based at least on the images and the user analysis;
    customizing the photo-based project automatically by performing one or more automatic customization actions based on the visual content in and the relevant metadata in the plurality of images;
    placing the plurality of images automatically in one or more particular page layouts of the photo based project based on the customization performed; and
    generating a printed product comprising the plurality of images based on the customization performed.

2. The server of claim 1, wherein said physical medium further stores executable instructions for:
    receiving a use case identifier identifying a use context for which the photo-based project would be utilized from the user-device.

3. The server of claim 2, wherein said physical medium further stores executable instructions for:
    customizing the photo-based project automatically based on the use case identifier.

4. The server of claim 2, wherein the use case identifier is selected from the group consisting of a wedding, a night out, an event with friends, a baby, a year in review, a trip, a water-related event, a beach trip, a lake trip, a pool trip, a snow-related event, a ski trip, and a road trip.

5. The server of claim 2, wherein the use case identifier is a wedding, and wherein said photo analysis comprises one or more of: identifying images that include a wedding cake, identifying images that include an altar, and identifying images that include a bride and a groom.

6. The server of claim 1, wherein said photo analysis further comprises one or more of: identifying similar images, identifying faces in the images, identifying objects in the images, identifying dimensions of the images, identifying undesirable images, and identifying relevant portions of the images, identifying images with an incorrect orientation, identifying images with incorrect color, brightness or contrast, and identifying images with red-eye.

7. The server of claim 1, wherein the automatic customization actions comprise one or more of: matching images automatically to a use case specific theme, grouping similar images, grouping images having identical faces, grouping images having identical objects, removing undesirable images, and cropping images to highlight relevant portions of said images.

8. The server of claim 1, wherein the automatic customization actions comprise applying correction function on the plurality of images, wherein the correction functions comprise one or more of: orienting images to an appropriate orientation, adjusting images to correct color, brightness or contrast, and removing red-eye from images.

9. The server of claim 1, wherein said automatic customization actions comprise one or more of: grouping images that include a wedding cake, grouping images that include an altar, and grouping images that include a bride and a groom.

10. The server of claim 1, wherein said physical medium further stores executable instructions for:
    adding text to the particular page layouts based on a subset of said embedded metadata.

11. The server of claim 1, wherein said physical medium further stores executable instructions for:
    organizing images based on the embedded metadata from the plurality of images.

12. The server of claim 1, wherein said physical medium further stores executable instructions for:
    reading embedded location metadata from the plurality of images;
    performing a lookup of additional location data based on the embedded location metadata; and
    adding text boxes to the ordered project reflecting said additional location data.

13. The server of claim 1, wherein the printed product is selected from the group consisting of a photo-book, a photo-card, and a photo-calendar.

14. A non-transitory, computer-readable storage medium storing executable instructions, which when executed by a computing device, cause the computing device to perform a method for automatically creating a photo-based project based on photo analysis and image metadata over a communications network, the storage medium comprising executable instructions to:
    establish a client-server connection between the server and a user-device connected to the communication network;
    receive a plurality of images from the user-device, read embedded metadata from the plurality of images, and store said plurality of images in the data repository;
    perform user analysis on an expected user of the photo-based project based on data from a social media platform;
    perform photo analysis on the plurality of images in the data repository to determine a visual content and relevant metadata in the images based at least on the images and the user analysis;
    customize the photo-based project automatically by performing one or more automatic customization actions based on the visual content in and the relevant metadata in the plurality of images;
    place the plurality of images automatically in one or more particular page layouts of the photo-based project based on the customization performed; and generate a printed product comprising the plurality of images based on the customization performed.

15. The storage medium of claim 14, wherein said storage medium further stores executable instructions for:
receiving a use case identifier identifying a use context for which the photo-based project would be utilized from the user-device.

16. The storage medium of claim 15, wherein said storage medium further stores executable instructions for:
customizing the photo-based project automatically based on the use case identifier.

17. The storage medium of claim 15, wherein the use-case context is selected from the group consisting of a wedding, a night out, an event with friends, a baby, a year in review, a trip, a water-related event, a beach trip, a lake trip, a pool trip, a snow-related event, a ski trip, and a road trip.

18. The storage medium of claim 14, wherein said photo analysis further comprises one or more of: identifying similar images, identifying faces in the images, identifying objects in the images, identifying dimensions of the images, identifying undesirable images, and identifying relevant portions of the images, identifying images with an incorrect orientation, identifying images with incorrect color, brightness or contrast, and identifying images with red-eye.

19. The storage medium of claim 14, wherein the automatic customization actions comprise one or more of: matching images automatically to a use case specific theme, grouping similar images, grouping images having identical faces, grouping images having identical objects, removing undesirable images, and cropping images to highlight relevant portions of said images.

20. The storage medium of claim 14, wherein the automatic customization actions comprise applying correction function on the plurality of images, wherein the correction functions comprise one or more of: orienting images to an appropriate orientation, adjusting images to correct color, brightness or contrast, and removing red-eye from images.

21. The storage medium of claim 14, wherein said storage medium further stores executable instructions for:
adding text to the particular page layouts based on a subset of said embedded metadata.

22. A method for automatically creating a photo-based project based on photo analysis and image metadata, comprising:
establishing a client-server connection between the server and a user-device connected to the communication network;
receiving a plurality of images from the user-device, reading embedded metadata from the plurality of images, and storing said plurality of images in the data repository;
performing user analysis on an expected user of the photo-based project based on data from a social media platform;
performing photo analysis on the plurality of images in the data repository to determine a visual content and relevant metadata in the images based at least on the images and the user analysis;
customizing the photo-based project automatically by performing one or more automatic customization actions based on the visual content in and the relevant metadata in the plurality of images;
placing the plurality of images automatically in one or more particular page layouts of the photo-based project based on the customization performed; and
generating a printed product comprising the plurality of images based on the customization performed.

23. The method of claim 22, further comprising:
receiving a use case identifier identifying a use case context for which the photo-based project would be utilized from the user-device.

24. The method of claim 22, further comprising:
adding text to the particular page layouts based on a subset of said embedded metadata.

25. The method of claim 23, further comprising: customizing the photo-based project automatically based on the use case identifier.

26. The method of claim 23, wherein the use case identifier is selected from the group consisting of a wedding, a night out, an event with friends, a baby, a year in review, a trip, a water-related event, a beach trip, a lake trip, a pool trip, a snow-related event, a ski trip, and a road trip.

27. The method of claim 22, wherein said photo analysis further comprises one or more of: identifying similar images, identifying faces in the images, identifying objects in the images, identifying dimensions of the images, identifying undesirable images, and identifying relevant portions of the images, identifying images with an incorrect orientation, identifying images with incorrect color, brightness or contrast, and identifying images with red-eye.

28. The method of claim 22, wherein the automatic customization actions comprise one or more of: matching images automatically to a use case specific theme, grouping similar images, grouping images having identical faces, grouping images having identical objects, removing undesirable images, and cropping images to highlight relevant portions of said images.

29. The method of claim 22, wherein the automatic customization actions comprise applying correction function on the plurality of images, wherein the correction functions comprise one or more of: orienting images to an appropriate orientation, adjusting images to correct color, brightness or contrast, and removing red-eye from images.

30. The method of claim 22, wherein the printed product is selected from the group consisting of a photo-book, a photo-card, and a photo-calendar.

\* \* \* \* \*